United States Patent [19]

Smith

[11] E Patent Number: Re. 33,730

[45] Reissued Date of Patent: Oct. 29, 1991

[54] REFUSE COLLECTION APPARATUS

[75] Inventor: Fred T. Smith, Palos Verdes Peninsula, Calif.

[73] Assignee: Sargent Industries, Inc., Los Angeles, Calif.

[21] Appl. No.: 77,432

[22] Filed: Jul. 24, 1987

Related U.S. Patent Documents

Reissue of:

[64] Patent No.: 3,999,669
Issued: Dec. 28, 1976
Appl. No.: 440,745
Filed: Feb. 8, 1974

U.S. Applications:

[62] Division of Ser. No. 264,021, Jun. 19, 1972, Pat. No. 3,899,091.

[51] Int. Cl.[5] ..... B65F 3/00

[52] U.S. Cl. ..... 414/525.4; 100/295; 100/233; 414/501; 414/917; 414/525.5; 60/431

[58] Field of Search ..... 414/525.1-525.6, 414/917, 518, 501, 502; 100/295, 233; 60/431

[56] References Cited

U.S. PATENT DOCUMENTS

| | | | |
|---|---|---|---|
| 2,430,973 | 11/1947 | Boissonnault | 100/233 X |
| 2,733,820 | 2/1956 | Starr | 414/525 |
| 2,865,286 | 12/1958 | Newell | 100/295 |
| 3,092,269 | 6/1963 | Brown et al. | 214/83.3 |
| 3,220,586 | 11/1965 | Gollnick | 214/83.3 X |
| 3,249,243 | 5/1966 | Herpich et al. | 214/83.3 |
| 3,455,471 | 7/1969 | Merther | 214/83.3 |
| 3,499,558 | 3/1970 | Rey | 214/83.3 |
| 3,556,324 | 1/1971 | McCarthy | 214/152 |
| 3,559,825 | 2/1971 | Meyer et al. | 214/83.3 |
| 3,615,029 | 10/1971 | Anderson | 214/83.3 |
| 3,662,908 | 5/1972 | Boda | 100/233 X |
| 3,667,629 | 6/1972 | La Voie | 214/83.3 |
| 3,682,336 | 8/1972 | Wieschel | 214/83.3 |
| 3,696,951 | 10/1972 | Toppins et al. | |
| 3,709,389 | 1/1973 | Steltz | 214/82 |
| 3,727,779 | 4/1973 | Herpich et al. | 214/83.3 |
| 3,767,068 | 10/1973 | Herpich et al. | 214/83.3 |
| 3,777,917 | 12/1973 | Herpich et al. | 214/83.3 |
| 3,799,375 | 3/1974 | Herpich et al. | 214/83.3 |

OTHER PUBLICATIONS

Garwood LP-800 Publication.

*Primary Examiner*—Frank E. Werner
*Attorney, Agent, or Firm*—Ellsworth R. Roston; Charles H. Schwartz

[57] ABSTRACT

A refuse collection apparatus including a storage body and a tailgate positioned rearwardly of the storage body which defines a hopper that is positioned adjacent to an opening into the storage body. An upper and a lower panel within the tailgate are pivotally connected and movably positioned with respect to the hopper. The upper panel is moved in a downward and rearward convexly curved path between an upward and forward position and a rearward and lowered position and the lower panel is rotated forwardly and rearwardly with respect to the upper panel. A fixed panel positioned in the tailgate structure defines the upper extent of the opening into the storage body and during upward movement of the upper panel, refuse is packed against the fixed panel.

The lower surface of the fixed panel may have an upwardly curved lower surface which imparts a forward direction of movement to refuse which is packed against it. The upper panel may have a curved forward surface in close proximity to a rearward surface of the fixed panel. During movement of the upper panel, the rearward surface of the fixed panel removes refuse from the curved forward surface. The upper panel is tilted as it moves and during its upward movement the lower portion of the upper panel is tilted forwardly. This imparts a forward movement to refuse which is moved through the opening into the storage body.

27 Claims, 14 Drawing Sheets

3
36
45
62
42
30
58
56
22
64
8
44
38
40
50
48
46
66
52
26
28
24
60
54
34
19
32
18
20
16
14
3
12

36
45
42
30
64
84
44
22
78
8
40
38
88
76
82
80
86
68
66
26
46
28
A
24
92
60
32
16
18
20
14
12

36
45
42
30
84
78
44
22
8
64
40
76
38
88
24
82
80
46
66
68
86
B
26
28
A
60
32
18
16
20
14
12

42
40
36
30
84
8
64
45
38
88
82
44
80
76
68
66
46
86
78
22
24
26
28
32
60
90
18
16
92
20
14
12

158
6
152
10
163
164
160
154
156
162
157
186
167
70
148
188
146
166
130
168
170
℄

238
40
40
44
44
247
251
68
76
268
270
246
248
232
266
254
252
249
250
264
225
228
224
238
260
236
262
234
258
256
240
230
226
222
198
B
A
A
B
A
B
242
200
223
244
192
192
216
218
A
214
A
217
220
B
200
B
219
114
202
48
221
48
204
212
200
204
208
210
196
205
206
194
209
192
192

316
324
322
320
329
287
314
318
-326-
299
315
328
330
332
317
196
P
286
285
291
283
299
293
287
283
282
290
284
288
305
292
310

308
296
306
294
295
312
298
26
278
276
280
274
60
272
273
302
300
304

REFUSE COLLECTION APPARATUS

Matter enclosed in heavy brackets [ ] appears in the original patent but forms no part of this reissue specification; matter printed in italics indicates the additions made by reissue.

This is a division of application Ser. No. 264,021, filed June 19, 1972, now U.S. Pat. No. 3,899,091.

BACKGROUND OF THE INVENTION

In collecting refuse, the refuse is generally picked up at individual locations, such as homes, and loaded into a storage body mounted on a truck. When the storage body becomes full, the truck must make a trip to a dumping point to unload the refuse. Depending upon the location of the dumping point, the time required for dumping can be quite substantial. This time is lost time since the refuse collection apparatus performs merely as a truck during its trip to and from the dumping site.

To reduce lost time spent in transporting refuse to the dumping site, modern refuse collection equipment functions by packing the refuse under high pressures within a storage body. The capacity of the refuse collection apparatus is, thereby, increased, and it is able to function by collecting refuse for a longer period of time before having to make a trip to the dump.

In refuse collection equipment presently in use, the storage body is mounted on a truck frame and mounted behind the storage body is a tailgate structure. The tailgate includes a loading hopper and packing means for removing the refuse from the hopper and packing it under high pressure within the storage body. It is common practice to mount a movable ejection panel within the storage body. During the packing operation, refuse is packed against the ejection panel which moves forwardly within the storage body as the packing operation progresses. When the storage body is completely full, the ejection panel has moved all the way forward to a position adjacent the front of the storage body. During the dumping operation, the tailgate structure is pivoted upwardly with respect to the storage body and the refuse is ejected by moving the ejection panel rearwardly to push the refuse out of the storage body.

Present refuse collection apparatus is rather large and unwieldy as a result of several factors. First, the tailgate structure which contains the packing mechanism is relatively long, and extends outward a considerable distance from the back of the storage body. The length of the tailgate structure is dictated, to a large extent, by the shape of the loading hopper defined in the lower portion of the tailgate. Present loading hoppers have a generally uniformly curved bottom which slopes gradually downward from a loading lip at the rear of the hopper to a low point and then gradually upward to an inclined passage which leads into the storage body. A panel is rotated through the hopper with the lower edge of the panel following along the curvature of the hopper bottom. Due to the curved configuration of the hopper bottom to accommodate rotation of the panel, the hopper is relatively long and shallow. Thus, the tailgate structure must also be relatively long which produces a tailgate whose center of mass is positioned a considerable distance rearward of the tailgate supporting structure.

A further factor contributing to large and unwieldly refuse collection equipment is the movement of the packing means within the tailgate structure. Many refuse collectors which use pivotally interconnected upper and lower panels for packing (see U.S. Pat. No. 3,143,230), employ an upper panel which is reciprocated in a straight-line movement between an upper and forward position and a lower and rearward position. To provide a high horizontal force component to the upper panel, the straight-line path must have a slope which provides substantial horizontal movement to the panel. This, in turn, requires that the tailgate structure be relatively long.

In present refuse collection equipment, the storage body is made from relatively heavy structural members to accommodate the high internal pressures imposed on the body. The high weight of the structural members further contributes to making the refuse collection equipment unwieldly. Added weight in the refuse storage body requires additional weight in the structural members for the truck frame which also increases the weight of the vehicle. As the length and weight of the vehicle are increased, it becomes increasingly more difficult to maneuver in congested areas in picking up refuse.

As stated, modern refuse collection equipment functions by packing refuse under high pressures within a storage body mounted on the frame of a truck. In present equipment, little or no packing is accomplished within the loading hopper. The refuse is merely swept from the hopper by rotation of a panel and packing does not occur until the refuse is moved into the storage body. To accomplish more uniform packing, it would be desirable if some of the packing could take place within the loading hopper.

During the packing operation, the refuse is moved into a storage body and compacted against an ejection panel. As the refuse is compacted, it may be moved in an upward direction against the top of the refuse storage body and impose large stresses on the top of the body. To accommodate these stresses, the top of the refuse body will have to be heavily reinforced and, therefore, heavy.

As the packing continues, the ejection panel moves forwardly within the storage body. The movement of the ejection panel is generally controlled by a telescopic hydraulic cylinder in which the effective hydraulic area within the cylinder varies with its degree of extension. As the ejection panel moves forwardly, the refuse within the body also moves as new refuse is packed into the body. The friction between the refuse within the body and the side walls of the body varies depending on the amount of refuse in the body. Due to the various factors which affect movement of the ejection panel and refuse within the body, it is difficult to obtain uniform compaction of the refuse throughout the storage body. Refuse in one region of the storage body may be very densely compacted while refuse in another region may be less densely compacted. It would be desirable to obtain compaction throughout the body at relatively high and uniform compaction pressures at or near the maximum pressures generated by the packing means since this would permit packing more refuse into a storage body of a given volume.

SUMMARY OF THE INVENTION

In accord with the present invention, I have provided a refuse collector which is capable of using a relatively short and deep loading hopper that is positioned rearwardly of and adjacent to an opening into a storage body. In utilizing such a hopper, an upper panel having a lower panel pivotally connected therewith is moved in a rearwardly and downwardly convexly curved path between an upward and forward position and a downward and rearward position. The path of movement provided the upper panel has a slope which changes from substantially vertical to substantially horizontal as the panel moves from a rearward lowered position to a forward raised position. This provides a high horizontal force component to the panel during the packing cycle without the use of a long tailgate structure.

The upper extremity of the opening into the storage body may be provided by a fixed panel having an upwardly curved lower surface. During upward movement of the packing panels, refuse is packed against the upwardly curved lower surface of the fixed panel. This provides a forward direction of movement to the refuse which assists its movement into the storage body and against the ejection panel. Further, by providing a forward direction of movement to the refuse, the refuse has less tendency to exert high pressures on the top of the refuse body.

In an embodiment of my invention which utilizes an upper and a lower packing panel which are pivotally interrelated for movement within a tailgate structure, the upper panel preferably has a curved forward surface in close proximity to a rearward surface of a fixed panel defining the upper extremity of the opening into the storage body. During relative movement between the upper panel and the fixed panel, the rearward surface of the fixed panel removes refuse from the curved forward surface of the upper panel.

In providing a rearwardly and downwardly convexly curved path for an upper panel, the panel is preferably tilted as it undergoes movement from a forward raised position to a rearward lowered position and vice versa. As the panel moves downwardly and rearwardly, the lower portion of the panel is tilted rearwardly while the upper portion of the panel is tilted forwardly. The lower panel is pivotally connected to the upper panel at a point adjacent its lower edge. Thus, as the lower portion of the panel is tilted rearwardly, the pivotal points for the lower panel are moved rearwardly to properly position the lower panel for movement with respect to the hopper. As the upper panel moves forwardly and upwardly, the tilting of the lower portion of the upper panel in a forward direction provides a forward movement to the refuse. This assists in moving the refuse through an opening into the storage body and in compacting the refuse against an ejection panel.

In accord with another aspect of my invention, a refuse collection apparatus is provided in which a packing panel having a curved forward packing surface is moved through a hopper. As the packing panel moves through the hopper, the refuse has a greater tendency to roll upwardly onto the surface of the panel due to its curved configuration. The refuse is, thus, more readily removed from the hopper by the panel.

The packing panel may have one or more upstanding ribs positioned on its curved forward surface. The ribs provide a reduced area for application of high localized pressures to refuse contacted by the rib or ribs as the panel moves through the hopper. If more than one rib is employed, the ribs are positioned in spaced relationship and preferably are positioned vertically with respect to the hopper bottom as the packing panel moves through the hopper. Each of the ribs has sloping side walls which are joined together to form a breaking surface. The sloping side walls of adjacent ribs define a packing region which is bounded by the adjacent side walls and the forward curved surface of the packing panel. Refuse which moves between adjacent ribs into contact with the forward curved surface of the panel is thereby compacted through compression between the side walls of the adjacent ribs.

Preferably, the loading hopper has a vertically inclined forward packing surface. Thus, as the packing panel moves through the hopper, refuse is compacted between the curved packing surface of the panel and the upwardly inclined forward packing surface of the hopper. If the packing panel is rotated to provide movement through the hopper and then lifted to remove refuse from the hopper, the curved packing surface of the panel preferably makes an angle of at least about 90° with the forward packing surface. This reduces the tendency for refuse to jam between the surface of the packing panel and the forward packing surface of the hopper during upward movement of the packing panel.

In another aspect of my invention, the loading hopper is provided with a straight rearward wall portion positioned between a loading lip and the hopper bottom. A packing panel is then provided which has a narrowed lower edge. The narrowed lower edge of the panel is then moved in contiguous relation to the straight rearward wall portion of the hopper as the panel moves into the hopper. Refuse which overhangs the loading lip of the hopper is, thereby, subjected to breaking forces by the narrowed lower edge of the packing panel during its movement into the hopper.

In view of the various aspects of my invention, I am able to provide a refuse collection apparatus having a relatively short and deep hopper which is quite different than hoppers employed in previous refuse collection equipment. Further, I am now able to provide a refuse collection apparatus in which the refuse is broken up and packed to a considerable degree within the loading hopper itself.

As a corollary to my overall invention, I have provided a unique packing panel for use in a refuse collection apparatus in which the panel has a curved surface that is adapted to contact refuse contained in a hopper during movement of the panel through the hopper. The curvature of the panel surface, as it moves through the hopper assists in removing refuse from the hopper which rolls upwardly onto the panel along the curved surface. Also, the packing panel of my invention may provide one or more upstanding ribs on the curved surface of the panel to provide a reduced area for application of high localized pressure to refuse which is contacted by the rib. When a plurality of ribs is employed which are positioned in spaced relation to each other, the side walls of adjacent ribs define a packing region which is bounded by the side walls and the curved surface of the packing panel. The packing panel may also have a narrowed edge which is adapted to provide high breaking pressures to refuse contacted by the edge.

A further corollary to may overall invention involves a unique refuse hopper which is particularly suitable for use in conjunction with the overall apparatus of my invention. The hopper has a lip over which refuse is dumped, a curved bottom portion and a straight wall portion between the lip and the curved bottom portion. Also provided in the hopper is an upwardly inclined structurally reinforced packing surface which is positioned opposite the straight wall portion. Side walls interconnect the bottom with the packing surface and the straight wall portion.

As described, refuse compactors presently in use include a storage body having a movable ejection panel within the body and packing means for compacting refuse within the body against the ejection panel. As refuse is compacted against the ejection panel, there is an incremental movement of the panel in a direction away from the packing means as the body is progressively filled with refuse. In accord with a further aspect of my invention, I have provided a unique means for hydraulically interrelating the movement of the ejection panel and the packing means to provide better compaction of the refuse. A first hydraulic means which controls the movement of the ejection panel is hydraulically interrelated with a second hydraulic means which controls the movement of the packing means. A sump means is provided for receiving hydraulic fluid from both of the first and second hydraulic means and a control means regulates the flow of hydraulic fluid from the first and second hydraulic means to the sump means.

The control means is set to operate at a predetermined pressure of hydraulic fluid in the second hydraulic means which controls movement of the packing means to momentarily dump hydraulic fluid from both the first and second hydraulic means to the sump means. Dumping of fluid ceases when the pressure of the hydraulic fluid in the second hydraulic means is reduced to a fixed level below the predetermined pressure. The predetermined pressure within the second hydraulic means which actuates the control means is generally set at or near the maximum operating pressure of the packing means. As a result, the refuse is packed at or near the maximum packing pressures obtainable throughout the entire loading operation. The incremental movement of the ejection panel away from the packing means during the packing operation is controlled entirely by the predetermined high pressure level within the hydraulic means which controls the movement of the packing means. Thus, the movement of the ejection panel is independent of such variables as the friction of refuse against the walls of the storage container or the effective hydraulic pressure surface within a telescopic cylinder which will vary with its degree of extension.

A further aspect of my invention concerns a hydraulic circuit for operation of an upper packing panel that is movably mounted within a tailgate structure for up-and-down movement with respect to a loading hopper and a lower packing panel mounted for forward and rearward rotation with respect to the hopper. A first hydraulic means is operably connected to the upper packer panel to provide up-and-down movement of the panel while a second hydraulic means is operably connected to the lower packer panel to provide forward and rearward rotation of the lower panel. The second hydraulic means provides a relatively quick rotation of the lower panel in a rearward direction with relatively low rotational force exerted on the panel and a relatively slow rotation of the lower panel in a forward direction with relatively high rotational force exerted on the panel.

A first feed means is provided to feed hydraulic fluid to the second hydraulic means to rotate the lower panel in a rearward direction and to hold the panel in a rearward position. A second feed means is provided to feed hydraulic fluid to the first hydraulic means while withdrawing hydraulic fluid from the first hydraulic means and combining the withdrawn fluid with the feed fluid to establish a regenerative loop to the first hydraulic means. The use of a regenerative loop provides relatively quick downward movement of the upper panel after which the upper panel is held in a lowered position. A third feed means is provided to feed hydraulic fluid to the second hydraulic means to rotate the lower panel in a forward direction and to hold the lower panel in a forward position. Lastly, a fourth feed means is provided to feed hydraulic fluid at a relatively high pressure to the first hydraulic means to move the upper packing panel in an upward direction to move refuse from the hopper and through an opening into a storage body.

A further aspect of the invention includes the provision of a unique storage body for containing refuse under pressure. The body includes a reinforced bottom, a pair of parallel reinforced side walls, and a top. The top has a uniformly curved configuration and curves upwardly from its juncture with the side walls. The high point in the curvature of the top lies midway between the side walls and the high point has a preselected chordal height. The preselected chordal height of the high point of the top curvature provides a top in which the metal is primarily in tension in resisting the forces exerted on the top by the side walls due to the pressure of refuse within the storage body. Preferably, reinforcing members positioned along the side walls at the line of juncture between the side walls and the top have a shape which reduces the abruptness in the change of the surface at the juncture between the side walls and the top to reduce the stress concentration at the juncture.

In the storage body of the present invention, the bottom portion of the storage body is preferably bent upwardly at either side to form side fold portions which are joined to the side walls to form a watertight dam between the bottom and the side walls. If an ejector panel is positioned within the storage body, the side fold portions are preferably bent adjacent their upper ends to form guideways which extend into corresponding grooveways on the sides of the ejector panel.

In the movement of an ejection panel within a storage body in accord with the invention, a hard metal slide plate is preferably attached to the structure supporting the ejection panel in sliding engagement with the metal forming the bottom of the storage body. The bottom of the storage body is formed of a softer metal than the slide plate. Hard refuse materials becomes imbedded in the metal of the floor in the region of contact of the floor with the slide plate during usage of the apparatus. The hard imbedded refuse materials form a slippery surface on which the slide plate moves.

An ejector panel having particularly suitable in the overall apparatus of the present invention has a packing surface formed from a plurality of arcuate segments. A brace member is positioned between pairs of arcuate segments and the chordal height of each of the segments is selected to permit the segments to be in tension in resisting packing pressure imposed by refuse. The length of arc of the arcuate segments is selected to reduce the end forces transmitted from the arcuate segments to the brace members which support them.

In accord with my invention, a storage body is utilized for holding refuse under pressure with the storage body having an opening through which refuse is packed. A plurality of parallel side support members are positioned along the side walls of the storage body to resist the side loading exerted by the pressure of refuse within the body. The pressures exerted by the refuse are higher adjacent the opening into the body. Thus, the side support members are spaced closer together in the region adjacent to the opening of the storage body and are moved further apart in the areas of the side wall which are positioned further away from the opening.

BRIEF DESCRIPTION OF THE DRAWINGS

In the drawings which are illustrative of an embodiment of my invention:

FIG. 17 is a partial side elevational view of the storage body;

DETAILED DESCRIPTION

Figure 1:
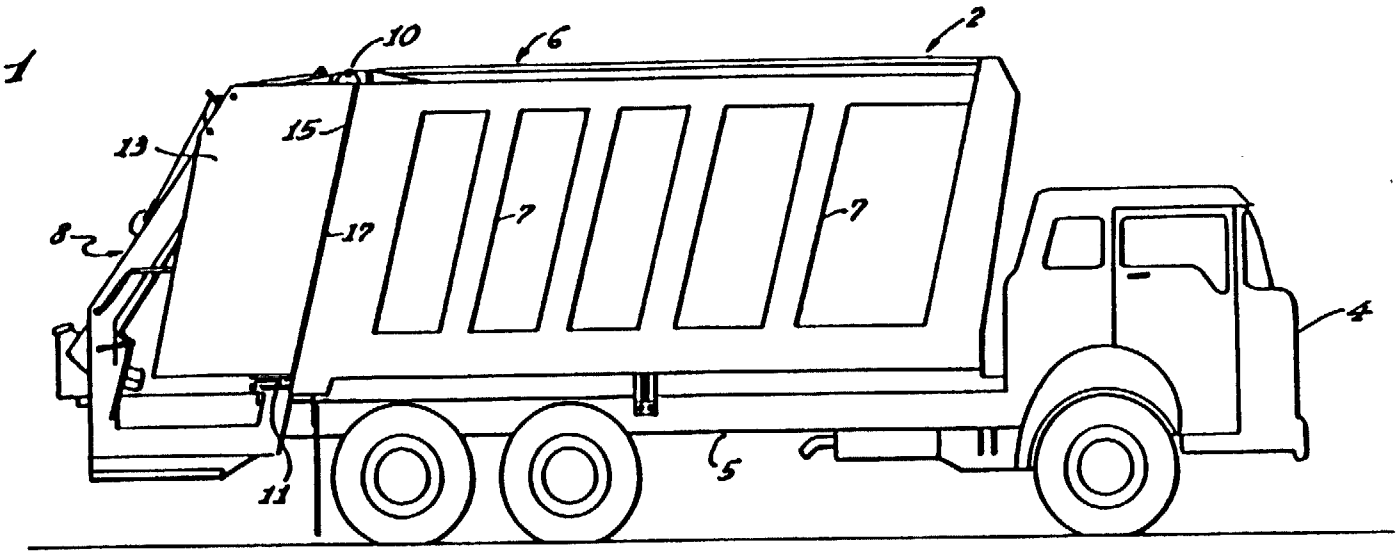
FIG. 1 is a side elevational view of a truck chassis supporting a storage body with a tailgate structure positioned rearwardly of the storage body.

FIG. 1 illustrates a refuse collection apparatus in combination with a wheeled vehicle with the overall combination referred to as a truck 2. The truck 2 includes a cab 4, a frame 5 which supports a storage body 6, and a tailgate 8. The tailgate 8 is connected to the storage body 6 through a pair of hinges 10 with a lock 11. On releasing the lock 11, the tailgate 8 may be pivoted upwardly with respect to the body 6 about the hinges 10.

A cover plate 13 is mounted on either side of the tailgate structure to cover certain of the mechanism which is positioned exteriorly of its side walls. The cover plates 13 are connected to the tailgate through hinges 15 and may be swung away from the tailgate by rotation about the hinges. The storage body 6 includes a plurality of parallel spaced side braces 7 which are spaced more closely together in the area adjacent to the connection of the body to the tailgate. Moving from the left to right in FIG. 1, the side braces 7 are positioned increasingly further apart. The rear edge of the body 6 forms a slanting surface 17 which joins a correspondingly slanted surface on the tailgate 8. The side supports 7 are each parallel to the slanting surface 17.

Figure 2:
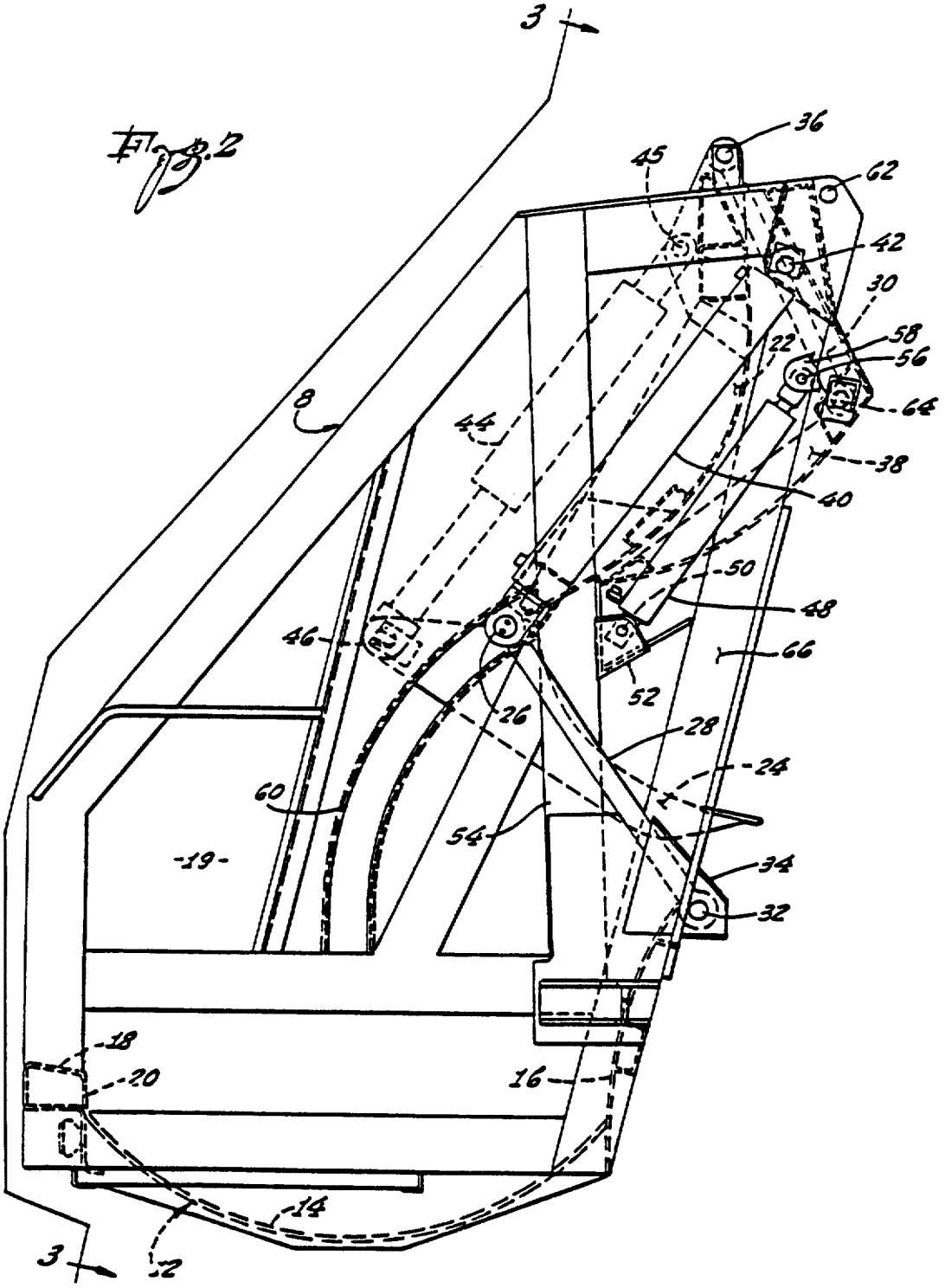
FIG. 2 is a side elevational view of the tailgate structure with the protective cover removed which shields certain of the movable structural elements.

FIG. 2 is a side elevational view of the tailgate 8 with the cover plate 13 removed. As shown, a hopper 12 is defined in the lower portion of the tailgate 8. The hopper 12 has a curved bottom 14, a vertically inclined forward packing surface 16, a loading lip 18 and a straight rearward wall portion 20 inerconnecting the loading lip with the curved bottom 14. In the use of the terms "forward" and "rearward", "forward" refers to a direction toward the cab 4 while "rearward" refers to a direction toward the tailgate 8.

Positioned between the side walls 19 of the tailgate 8 are an upper packing panel 22 and a lower packing panel 24. A pair of lower stub shafts 26 carried at the lower extremity of the upper panel 22 pivotally support the lower packing panel 24 for rotational movement with respect to the upper panel 22. A pair of lower links 28 are each pivotally connected to a stub shaft 26 at one end while their other ends are pivotally connected to pivots 32 on either side of the tailgate structure supported by pivot brackets 34. The upper packing panel 22 is also supported by a pair of upper links 30 which are each pivotally connected at one end to an upper stub shaft 36 carried on the upper panel 22. The other ends of the upper links 30 are connected to pivots 64 supported by the tailgate structure.

A fixed panel 38 is positioned transversely across the tailgate 8 and defines the upper extremity of an opening 66 leading from the tailgate 8 into the storage body 6 when the tailgate and the storage body are connected together. The lower extremity of the opening 66 is defined by the upper end of the packing surface 16 within hopper 12.

The motive power for the upper packing panel 22 is provided by a pair of hydraulic cylinders 40 which are mounted on either side of the tailgate 8 exteriorly of the side walls 19. The hydraulic cylinder 40 are each connected at their upper ends to pivots 42 supported by the tailgate 8. The lower ends of the hydraulic cylinders are pivotally connected to extensions of the lower stub shafts 26 which extend through curved slots 60 in the side walls 19.

A pair of hydraulic cylinders 44 are mounted inwardly of the side walls 19 to provide the motive power for the lower packing panel 24. The upper portions of the cylinders 44 are connected to pivots 45 carried by the upper packing panel 22 while the lower portions of the cylinders 44 are connected to pivots 46 carried by the lower packing panel 24.

A pair of hydraulic cylinders 48 mounted exteriorly of side walls 19 provides the motive power for raising and lowering the tailgate 8 with respect to the refuse body 6. The forward ends of the cylinders 48 are connected to pivots 56 carried by pivot brace members 58 attached to the refuse body 6. The rearward ends of the cylinders 48 are connected to pivots 50 supported by pivot brackets 52 carried by structural members 54 of the tailgate 8. As illustrated, a portion of the upper panel 22 and portions of the upper links 30 extend through openings (not shown) in the upper surface of the tailgate 8 when the upper panel 22 is positioned as in FIG. 2.

A pair of pivot openings 62 in the tailgate 8 are engaged by a pin (not shown) in providing hinges 10 (FIG. 1) between the tailgate 8 and the storage body 6. On extension of the hydraulic cylinders 48, the tailgate structure is pivoted upwardly about the axis of the pivot opening 62 with respect to the storage body 6. When the hydraulic cylinder 48 are contracted, the tailgate 8 pivots downwardly about the axis of the pivot openings 62 into engagement with the rearward surface 17 of the storage body 6 as shown in FIG. 1.

Figure 3:
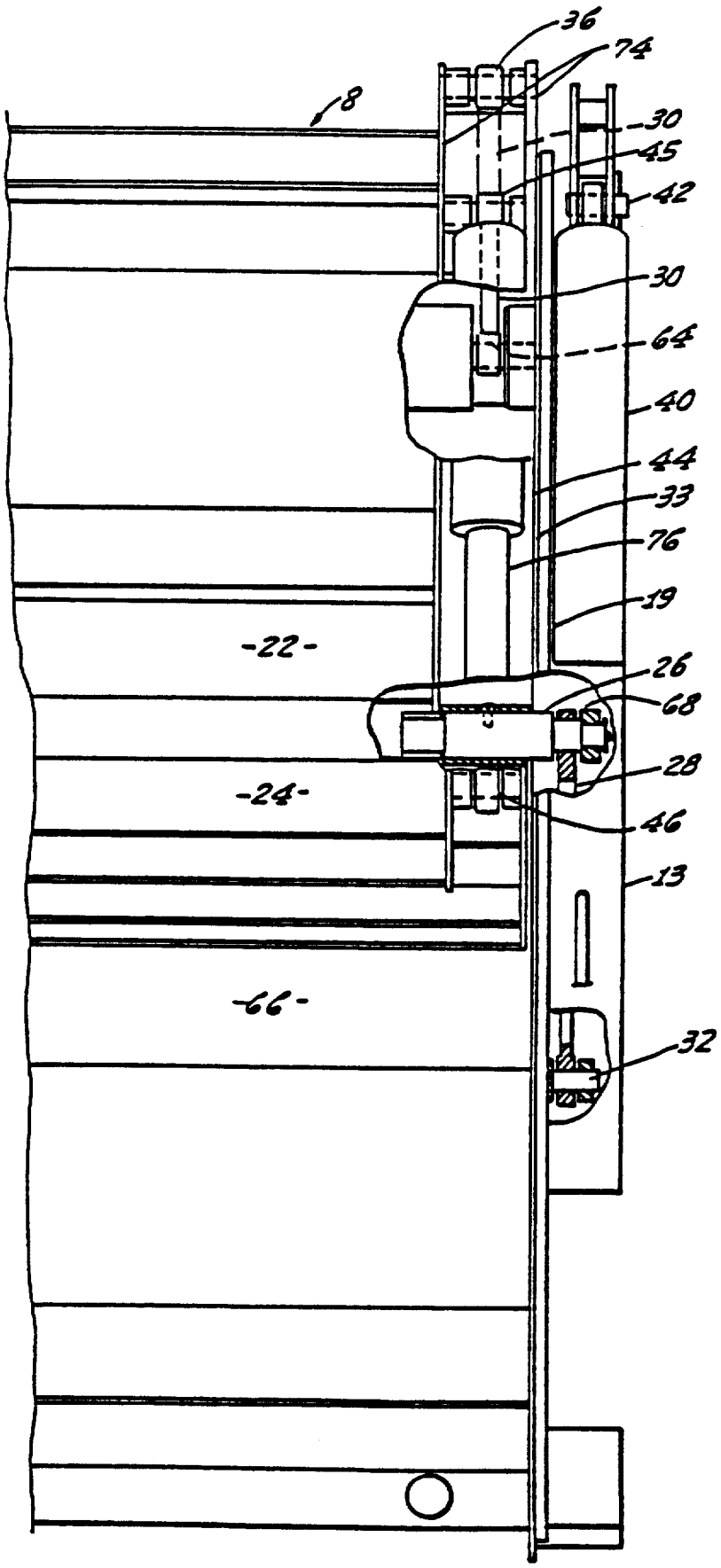
FIG. 3 is partial end view of the tailgate structure, as seen from the left side along lines 3—3 in FIG. 2, with portions broken away or in section to illustrate specific details.

FIG. 3, which is a partial end view of the tailgate 8, illustrates the relative positions of the upper links 30, the lower links 28, and the hydraulic cylinders 40 and 44. The stub shaft 26 extends through the side wall 19 and connected to its outer end are a lower link 28 and a piston rod 68 extending from hydraulic cylinder 40. The cover plate 13 shields the hydraulic cylinder 40 and lower link 28 to prevent contact with these elements during cycling of the packing means.

The upper link 30 is pivotally connected to upper stub shaft 36 which is held between support braces 74 extending from the upper panel 22. The hydraulic cylinder 44 is pivotally connected to a pivot shaft 45 which is also held between support braces 74. A piston rod 76 extending from hydraulic cylinder 44 is connected at its lower end to the pivot 46 carried by the lower panel 24. The upper links 30 and hydraulic cylinders 44 are positioned inwardly from the side wall 19 while the hydraulic cylinders 40 and lower links 28 are positioned outwardly of side wall 19.

As illustrated in FIG. 3, the upper links 30, lower links 28 and the hydraulic cylinders 40 and 44 are each mounted to provide for sime lateral movement with respect to their pivotal mountings. This permits the links 30 and 28 and cylinders 40 and 44 to shift laterally under the influence of unbalanced loading on the upper panel 22 or lower panel 24. The bearing surfaces on the supporting pivotal mountings are woven Teflon fabric bonded with an adhesive to the pivot support shaft which engages the eye connection of the link or hydraulic cylinder. During usage, the Teflon fabric flows into any holes in the pivot support shaft to give a uniform bearing surface. Also, the Teflon provides a low coefficient of friction to permit lateral movement between the eye connection of the link or hydraulic piston and the pivotal support shaft to provide a lateral floating action of the upper panel 22 and lower panel 24 relative to the tailgate 8. Alternatively, the woven Teflon fabric is bonded with an adhesive to the inner surface of a steel bushing which is pressed into the eye connection of the links or the rod ends of the hydraulic cylinders. The inner surface of the bushing then engages the pivot support shaft with the Teflon providing a low coefficient of friction between the bushing and the shaft.

A gap 33 is provided between the sides of the upper and lower panels 22 and 24, and the inner surfaces of the tailgate side walls 19. The side walls 19 are constructed of steel sheets which are both strong and hard such as 165,000 psi sheets having a Brinnell hardness of 360 to 400. The extreme hardness of side walls 19 provides a durable bearing surface against which the relatively large side areas of the upper and lower panels 22 and 24 may rub during lateral movement of the panels to provide a floating action in movement of the panels to relieve unbalanced refuse loadings.

Figure 4:
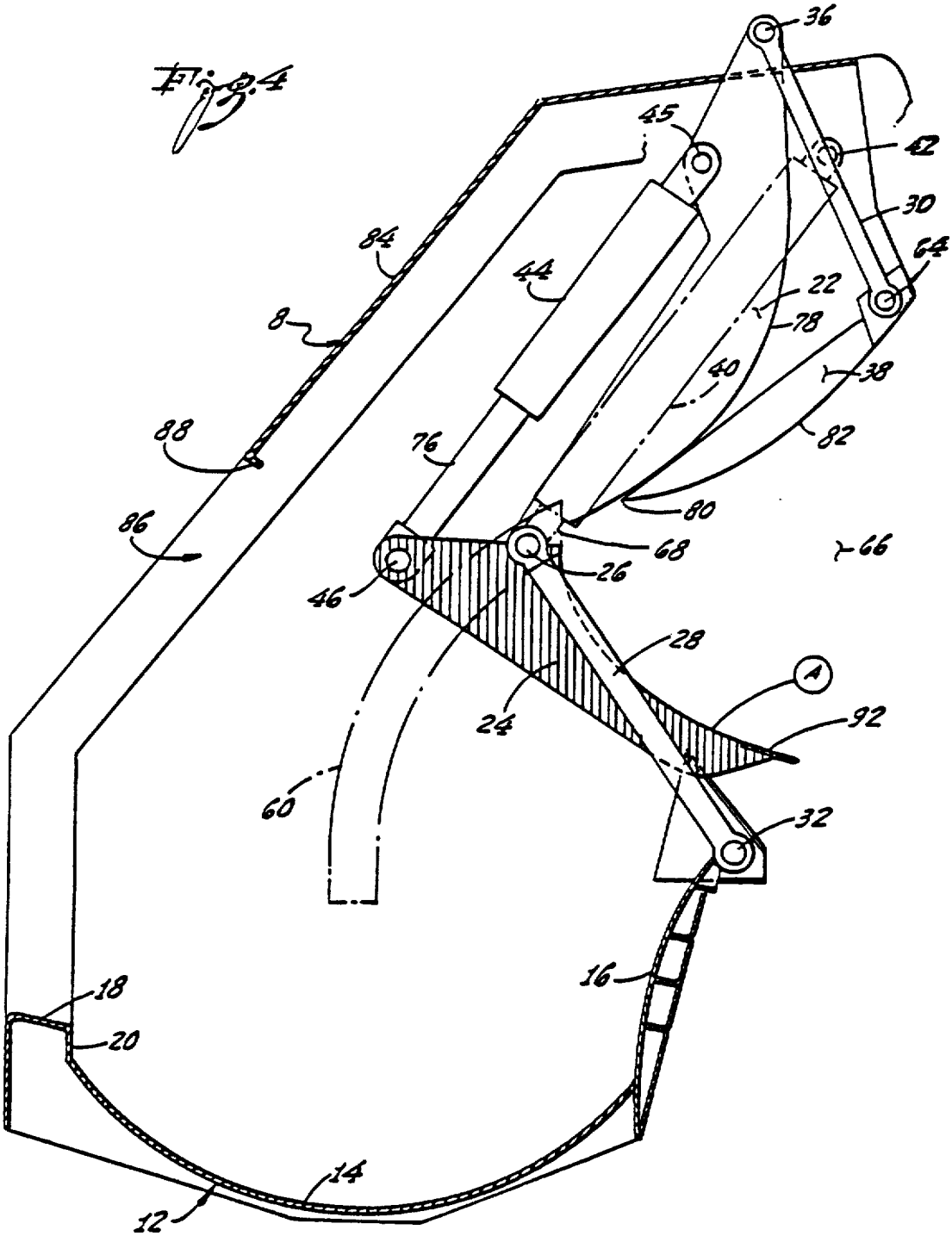
FIG. 4 is a partial side sectional view of the tailgate structure illustrating the upper and lower packing panels in a raised position prior to imitiation of the packing cycle.

The movement of the upper packing panel 22 and the lower packing panel 24 during cycling is illustrated in FIGS. 4–7 which are partial side sectional views of the tailgate 8. The lower panel 24 has been shaded in these Figures to better illustrate its movement. FIG. 4 illustrates the beginning of a packing cycle with the upper panel 22 in a raised forward position and the lower packing panel 24 rotated forward with respect to the upper panel 22. In this position, refuse is held within the storage body 6 by the lower packing panel 24 which extends into the opening 66. To hold the panels in the position shown in FIG. 4, hydraulic cylinders 44 are extended while hydraulic cylinders 40 are contracted.

The upper packing panel 22 has a curved forward surface 78 while the fixed panel 38 has a lower edge surface 80 which is in close proximity to the surface 78. The fixed panel 38 has a curved upwardly extending lower surface 82. As the upper panel 22 is raised with the lower panel 24 held in the position shown in FIG. 4, refuse is packed against the curved lower surface 82. Due to the curvature of surface 82, the refuse is given a forward direction of movement. Thus, the curvature of the lower surface 82 is an important factor in insuring even packing of the refuse within the storage body 6.

A rear opening 86 in the tailgater 8 permits refuse to be dumped into the hopper 12 over the lip 18. The tailgate 8 has a rear wall 84 which terminates at an inwardly bent portion 88. The upper extremity of the opening 86 is defined by the bent portion 88 while the lower extremity is defined by the lip 18.

Figure 5:
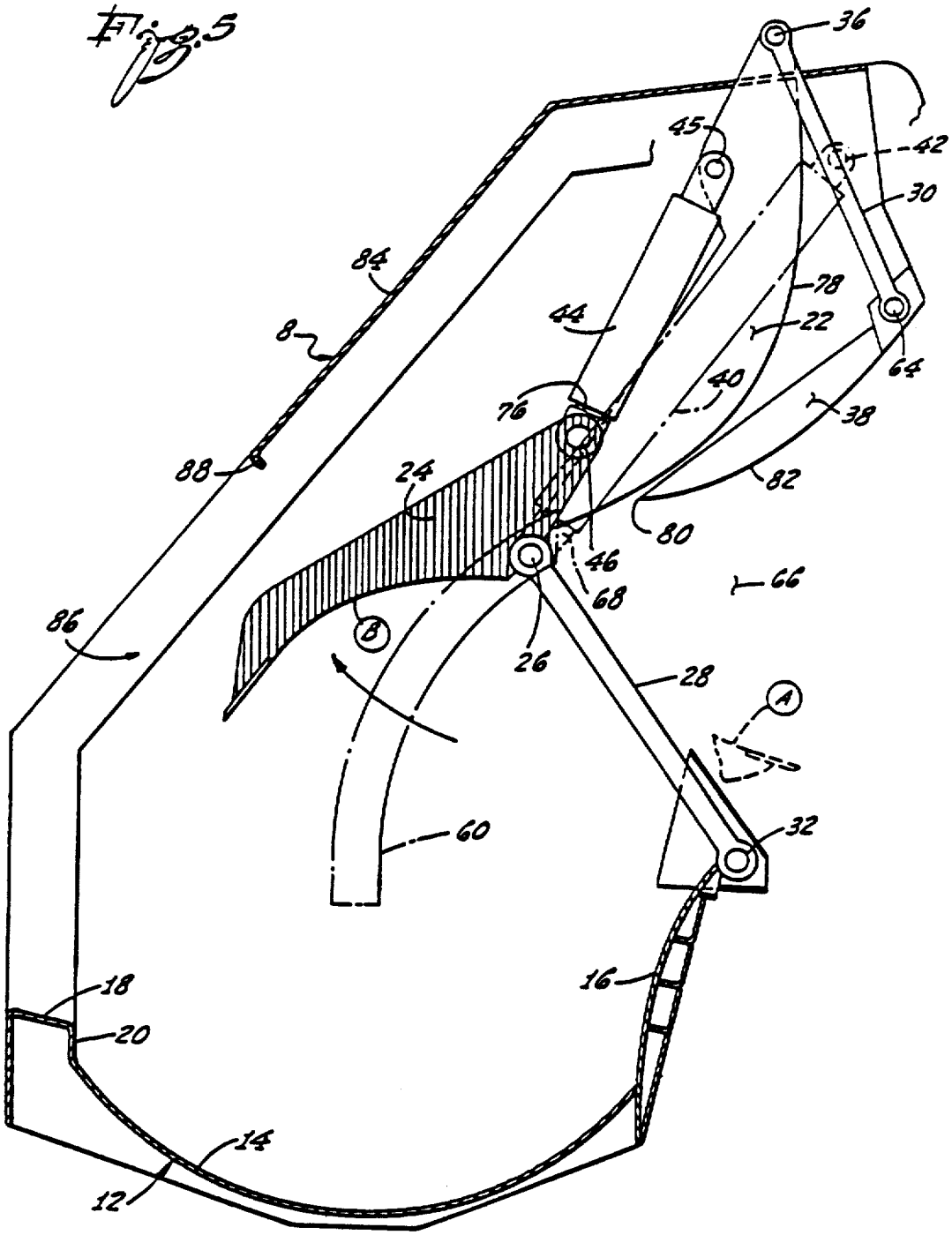
FIG. 5 is a partial side sectional view, similar to FIG. 4, showing the rotation of the lower packing panel in a rearward direction with respect to the upper packing panel in the first step of the packing cycle.

As shown in FIG. 5, during the first movement of the packing cycle the lower packing panel 24 is rotated rearwardly as shown by the arrow from position A to position B. During this movement, the lower stub shafts 26 on which the lower panel 24 is pivotally mounted are held in an upward position by the upper panel 2. Thus, as the lower panel 24 rotates rearwardly, it passes well above refuse contained in the hopper 12. Since the lower panel 24 does not encounter resistance during its rearward rotation to position B, this movement is relatively quick.

Figure 6:
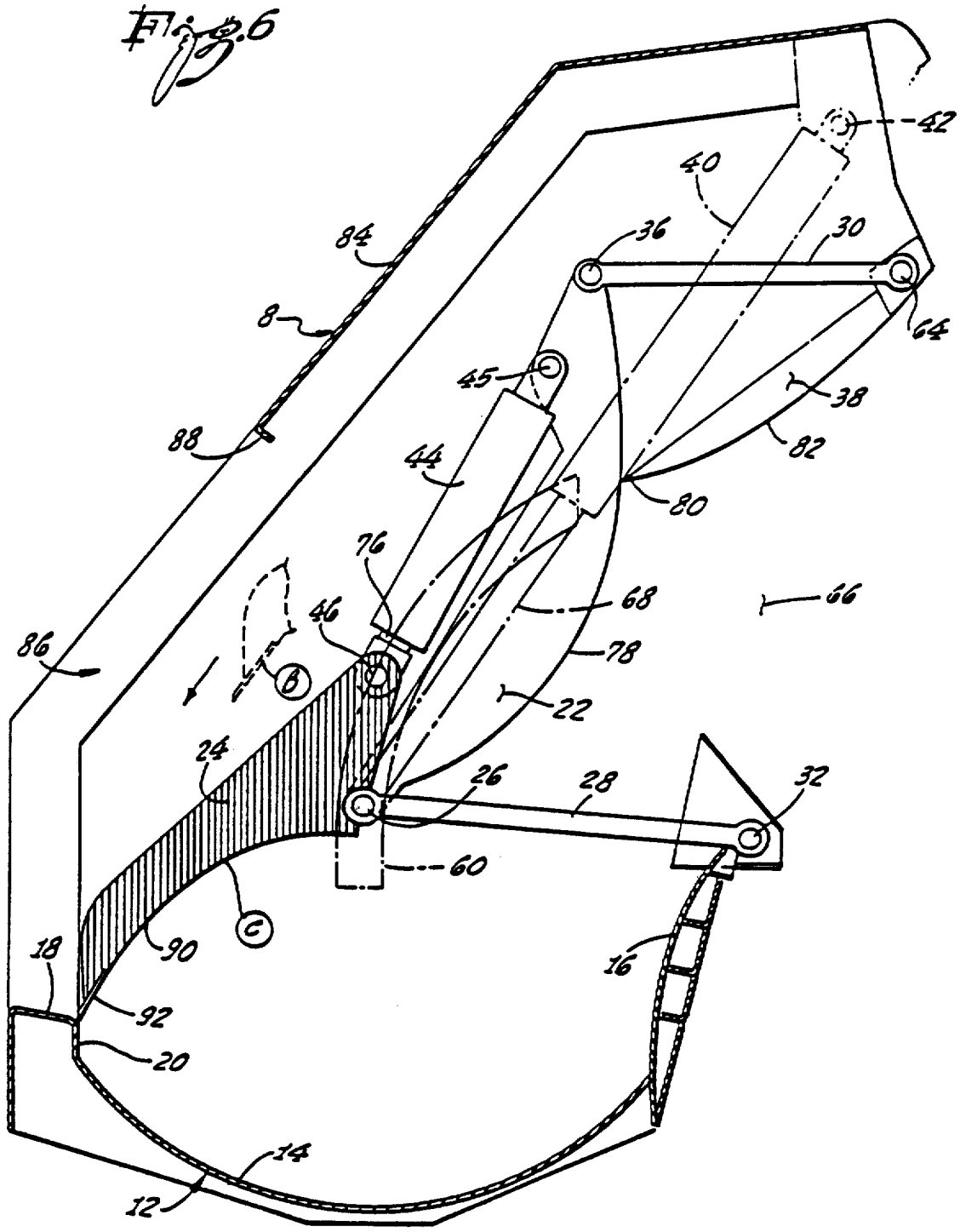
FIG. 6 is a partial side sectional view, similar to FIG. 5, illustrating the next movement in the packing cycle in which the upper packing panel is moved from a forward and upward position to a lowered and rearward position.

Following rotation of the lower packing panel to position B, the upper packing panel 22 is moved downwardly in a downward and rearward convexly curved path, as illustrated in FIG. 6. As the upper panel 22 moves downwardly and rearwardly, the hydraulic cylinders 40 are extended. When the lower packing panel 24 moves to position C the panel 24 enters the hopper 12. The packing panel 24 has a curved packing surface 90 whose lower end terminates in a narrowed edge 92. Due to the configuration of the lower panel 24 and the movement imparted to it by the movement of the upper packing panel 22, the edge 92 enters the hopper 12 in a vertical movement during which the edge 92 moves along the straight rearward surface 20 of the hopper 12.

The movement of the edge 92 as it enters the hopper 12 is an important consideration in the overall function of the apparatus. During the loading of refuse through the opening 86 into the hopper 12, refuse will frequently overhang the loading lip 18. Due to the relative movement between the edge 92 and the loading lip 18 as the lower panel 24 enters the hopper, refuse which overhangs the lower lip into the hopper 12 will encounter the reduced area presented by the edge 92 and be exposed to high pressures which will tend to shear the refuse and break it.

As shown in FIG. 6, the lower links 28 are longer than the upper links 30. Thus, as the upper panel 22 moves downwardly and rearwardly, the lower portion of the upper panel 22 is tilted rearwardly. When this occurs, the stub shafts 26 are likewisely moved rearwardly due to the longer lengths of the links 28. This results in moving the pivot points for the lower panel 24 in a rearward direction to properly position the lower panel 24 with respect to the hopper 12. During the downward movement of the upper panel 22, only slight resistance is encountered. Thus, the downward movement of the upper panel 22 is a relatively quick movement. As shown in FIG. 6, the lower edge surface 80 of the fixed panel 38 is maintained in contiguous relation to the curved forward surface 78 of the upper panel 22 during relative movement between the upper panel 22 and the fixed panel 38.

Figure 7:
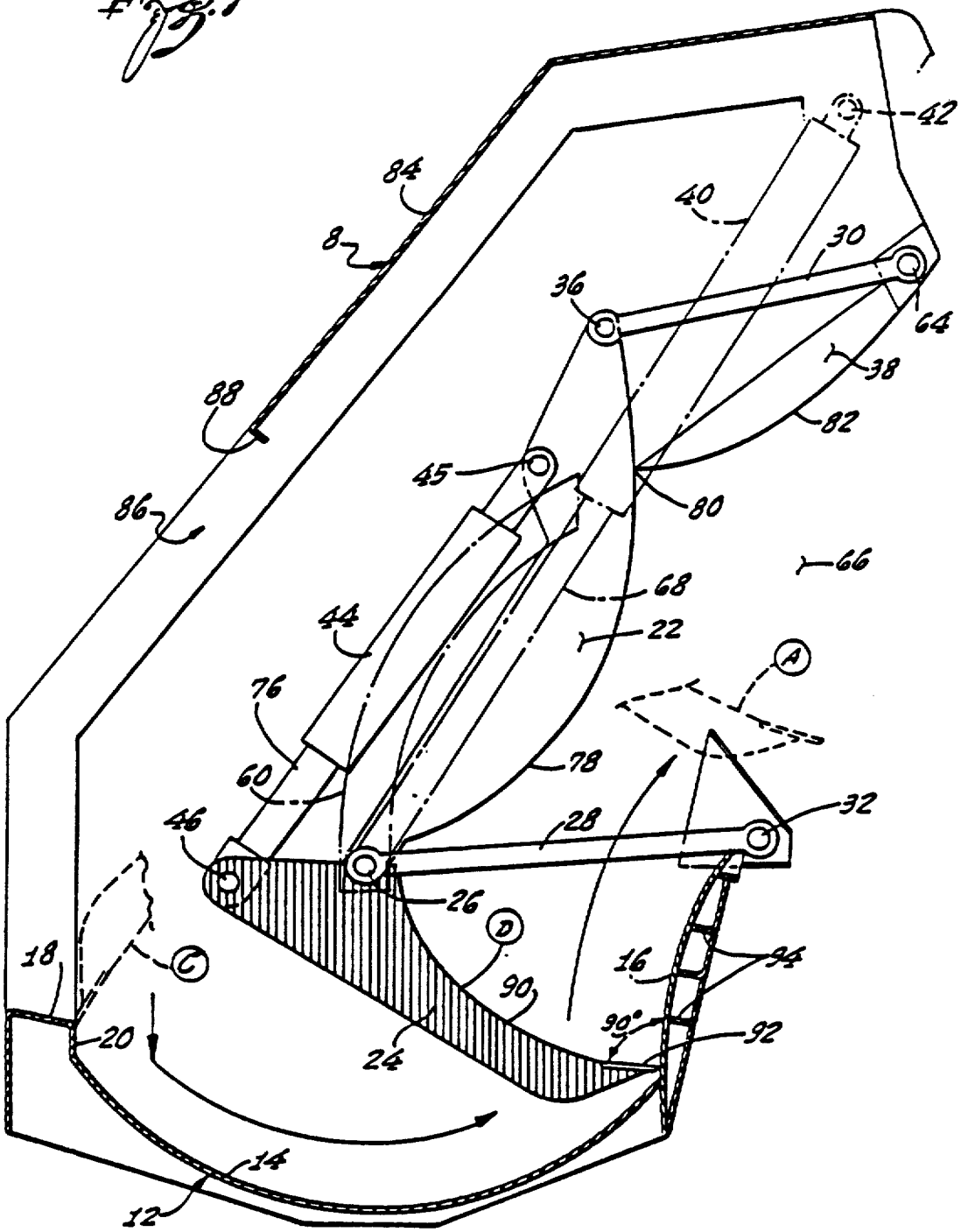
FIG. 7 is a partial side sectional view, similar to FIG. 6, illustrating the next movement in the packing cycle in which the lower packing panel has moved forwardly through the loading hopper while the upper packing panel has been held in a lowered position.

The next movement in the packing cycle is illustrated in FIG. 7 which shows the movement of the lower packing panel 24 within the hopper 12. As illustrated, the lower panel 24 in moving from position C to position D, first moves downwardly into the hopper along the straight rearward wall portion 20 of the hopper 12. After reaching the juncture between the straight wall portion 20 and the curved bottom 14, the lower packing panel 24 is then pivoted forwardly about the stub shafts 26. As the panel 24 pivots forwardly through the hopper 12, the lower edge 92 of the panel 24 moves in close proximity to the curved bottom 14. During the movement of the lower panel 24 through the hopper 12, refuse within the hopper is packed between the curved packing surface 90 and the vertically inclined packing surface 16. Due to the large pressures imposed on the packing surface 16, it is reinforced by internal bracing members 94.

The packing which occurs within the hopper 12 between the curved packing surface 90 and the vertically inclined packing surface 16 is quite important to the overall functioning of my apparatus. By obtaining a considerable degree of packing within the hopper 12 itself as the lower packing panel 24 moves through the hopper, the overall packing efficiency of the apparatus is greatly improved. As the lower packing panel 24 moves through the hopper, the curved packing surface 90 provides another important function. Due to the curved configuration of the surface 90, the refuse within the hopper 12 has a greater tendency to move upwardly along the surface 90. Thus, the refuse, in addition to being packed within the hopper 12, is rolled upwardly along the surface 90 which assists the removal of the refuse from the hopper 12 by the lower panel 24. The rolling action of the refuse as it moves upwardly on panel 24 also applies an abrasive action to the refuse which tends to break it up into smaller pieces.

When the lower packing panel 24 reaches position D as shown in FIG. 7, the angle between the curved packing surface 90 and the vertically inclined packing surface 16 is preferably 90° or greater. This tends to prevent refuse from jamming between the curved packing surface 90 and the vertically inclined packing surface 16 during the next movement in the packing cycle. During the movement of the lower packing panel through the hopper 12, considerable resistance may be encountered. Thus, this movement is a relatively slow one with a high rotational force being exerted on the lower packing panel 24 by the hydraulic cylinders 44.

The next movement in the packing cycle is also illustrated in FIG. 7 by the arrow leading from the solid line position of the lower packing panel 24 in position D to the position of the lower packing panel outlined in phantom as position A. When the lower packing panel 24 reaches position A, the position of the upper packing panel 22 and the lower packing panel 24 is as shown in FIG. 4.

During the movement of the lower packing panel 24 from position D to position A, the lower panel 24 is held in a fixed position by extension of the hydraulic cylinders 44. With the lower packing panel 24 thus held, the upper packing panel 22 is moved forwardly and upwardly by contraction of the hydraulic cylinders 40. During this portion of the packing cycle, high resistance is encountered in the upward movement of the upper packing panel 22. The movement is, therefore, relatively slow with a high upward force being exerted through the hydraulic cylinders 40. As the lower packing panel 24 is lifted upwardly by the movement of the upper packing panel 22, the edge 92 of the lower panel 24 follows along the curvature of the vertically inclined packing surface 16. Thus, during this upward movement, additional packing takes place against the surface 16.

The lower edge surface 80 follows in close proximity the curved forward surface 78 during relative movement between the upper packing panel 22 and the fixed panel 38. As a result, refuse is continuously removed from the surface 78 by the lower edge surface 80 during relative movement between the upper panel 22 and the fixed panel 38.

As the upper packing panel 22 is moved upwardly, refuse supported on the curved packing surface 90 and the curved forward surface 78 is forced against the curved lower surface 92 of the fixed panel 38. As the refuse is packed against lower surface 82, it is given a forward movement due to the curvature of the surface 82. This assists in moving the refuse through the opening 66 into the refuse body 6.

Further, the path of upward movement of the upper packing panel 22 provides a horizontal force component to the panel which increases as the panel moves upwardly. The lower panel links 28 are longer than the upper links 30. During upward movement of the panel 22, this produces a forward tilting of the lower portion of the upper panel 22. The forward tilting provides an additional forward movement to the refuse and assists in its movement through the opening 66 into the storage body 6.

When the upper packing panel 22 and the lower packing panel 24 reach the extent of their upper movement to occupy the positions shown in FIG. 4, the packing cycle is complete. In this position, the lower packing panel 24 effectively closes the opening 66 into the storage body 6 and prevents refuse from rolling out of the storage body and back into the hopper 12. Also, during the upward movement of the upper panel 22 to the position shown in FIG. 4, the narrowed edge 92 of the panel 24 is moved into the opening 66 and into contact with the refuse therein. This applied a breaking and wedging force to the refuse through contact between the narrowed edge 92 and the refuse which helps to eliminate fall-out of the refuse through the opening during the packing cycle. The hopper interior including the surfaces 14 and 16 are made from strong, hard steel such as 165,000 psi steel sheets having a Brinnell hardness of 360–400.

Figure 8:
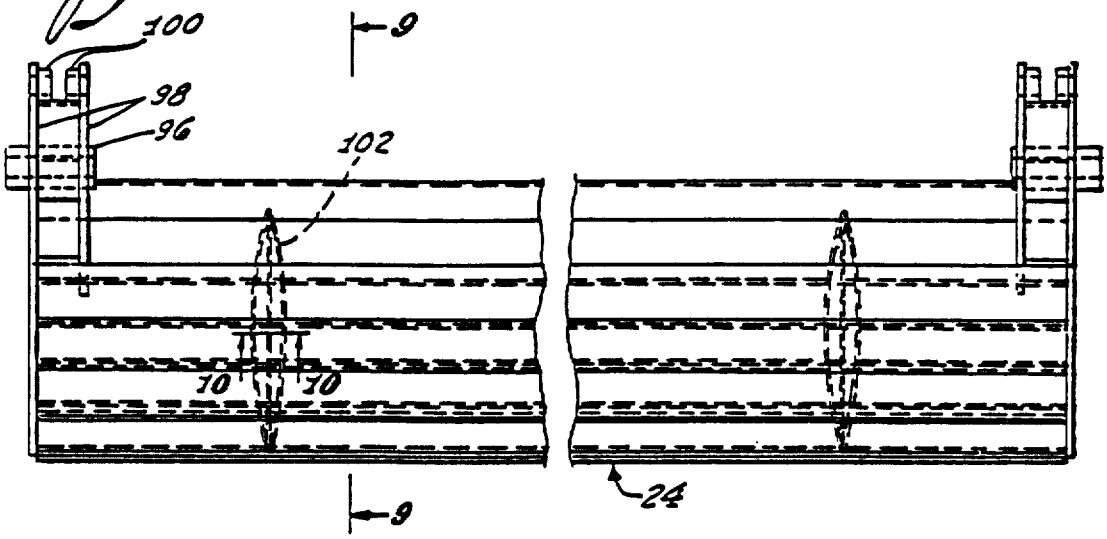
FIG. 8 is a front elevational view of a lower packing panel.

Turning to FIG. 8, there is shown an elevational view of the lower packing panel 24 as it would be viewed from the rear if positioned within the tailgate 8. The panel 24 includes a pair of stub sleeves 96 which are engaged by the lower stub shafts 26 in rotatably supporting the lower panel 24 with respect to the upper panel 22. Support plates 98 which project upwardly from the panel 24 each support an apertured boss 100. The space between adjacent bosses 100 receives the lower end of the piston rod 76 and a pin passing through the openings in the bosses 100 provides the pivot 45 between piston rod 76 and the lower panel 24.

Figure 9:
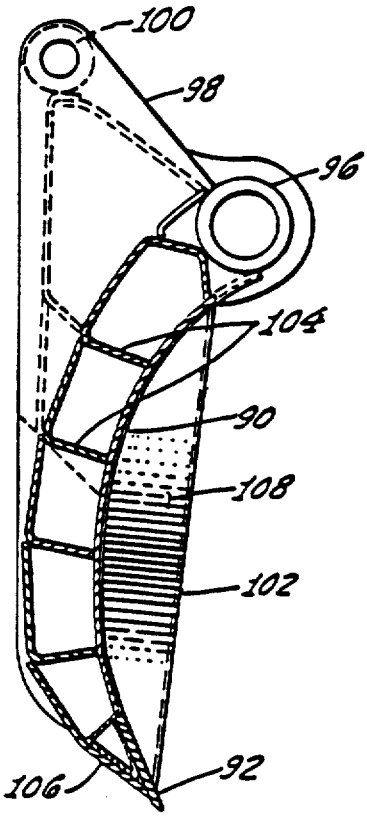
FIG. 9 is a sectional view through the packing panel of FIG. 8 along the lines 9—9.

As shown in FIG. 8, a plurality of ribs 102 project from the curved packing surface 90 of the panel 24. Turning to FIG. 9, which is a sectional view along the lines 8–9 of FIG. 8, the curved packing surface 90 is supported by a plurality of internal bracing members 104. The bracing members 104 are positioned substantially normal to the curved surface 90 to provide the surface 90 with the structural rigidity required to withstand the high pressures imposed during the packing operation. The edge 92 is formed of a thickened piece of metal to withstand the high stresses imposed when the lower panel 24 enters the hopper 12. To provide additional rigidity for the edge 92, a thickened edge support member 106 is positioned on the back side of the panel 24 in contact with the side surface of the edge member 92.

Figure 10:
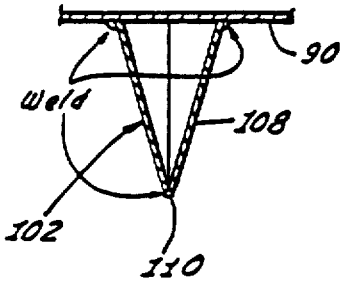
FIG. 10 is a sectional view through a rib portion of the packing panel of FIG. 8 along the lines 10—10.

A sectional view through one of the ribs 102 is shown in FIG. 10, which is taken along the lines 10—10 of FIG. 8. As illustrated, the rib 102 is composed of two side walls 108. The side walls 108 are joined together along their outer extremities to form a breaking surface 110. From the breaking surface 110, the side walls 108 are sloped outwardly to join the curved surface 90.

In usage, as the panel 124 moves through the hopper 12, the reduced area presented by the breaking surface 110 provides an area of increased pressure when the surface 110 encounters refuse. The sloping side walls 108 provide packing regions between adjacent ribs 102. As shown in FIG. 8, the ribs 102 are parallel to each other and are positioned vertically with respect to the edge 92 of the panel 24. Due to the slope of the side walls 108, the distance between the surfaces of adjacent ribs 102 decreases within the distance from the surface 110 to the curved surface 90. Thus, as refuse moves between the side walls 108 of adjacent ribs 102 into contact with the curved surface 90, it is compacted due to the convergence of the adjacent side walls 108. The ribs 102 break up the refuse through application of high localized forces to the refuse and the breaking and compacting action of the ribs 102 serves to hold the refuse on the side walls 108 and the surface 110 since it then has less tendency to spring back to its original shape.

Figure 11:
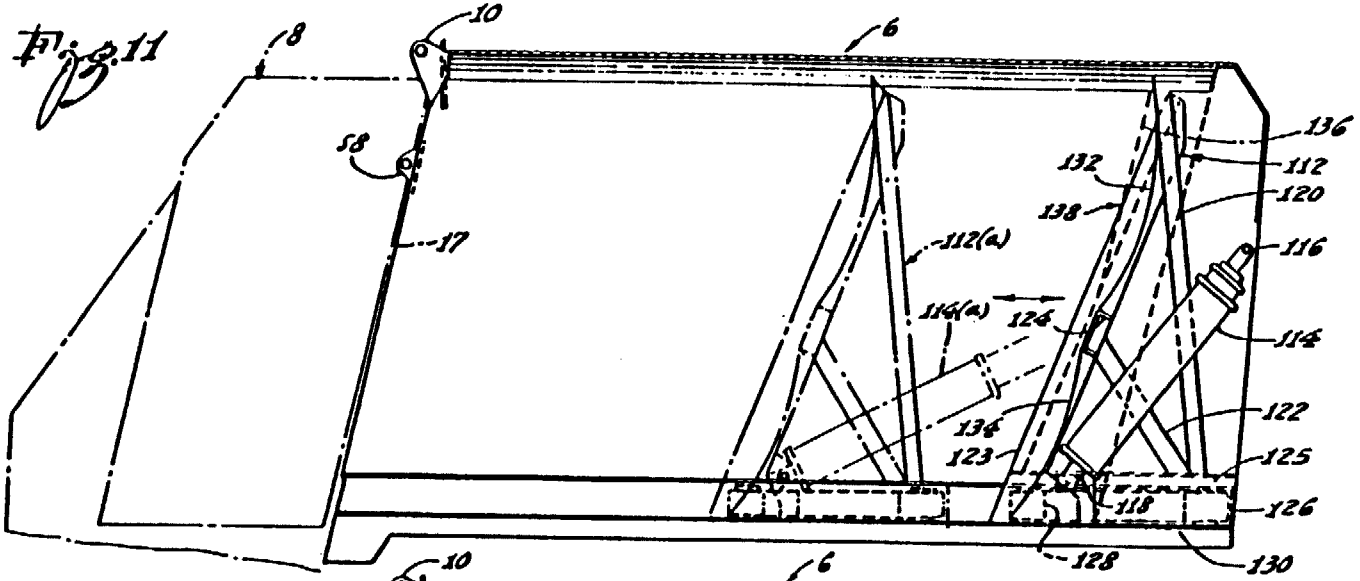
FIG. 11 is a side elevational view of a storage body, partly in section, to illustrate movement of the ejection panel within the storage body.
Figure 12:
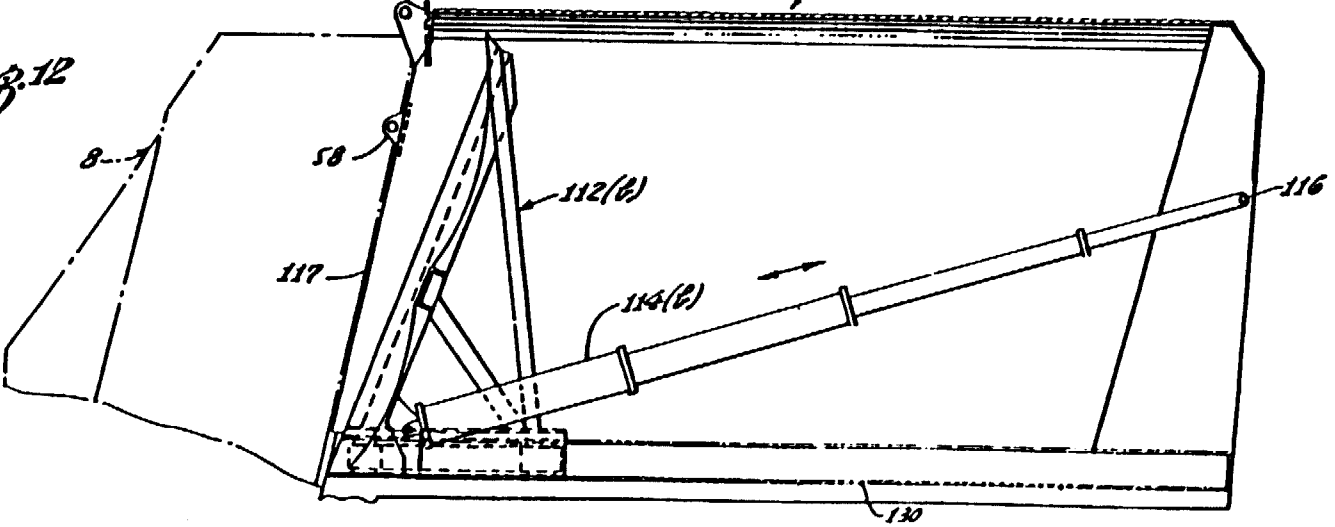
FIG. 12 is a partial section side elevational view, similar to FIG. 11, illustrating the movement of the ejection panel within the storage body.

FIGS. 11 and 12 are each partially sectioned elevational views of the storage body 6 indicating the position of an ejection panel 112 during various phases of the overall packing operation. As shown to the right in FIG. 11, the ejection panel 112 is connected through a pivot 118 to a telescopic ejection cylinder 114 that is pivotally connected at its forward end to a fixed pivot 116. The ejection panel 112 includes a pair of vertically positioned supports 120 which are connected to horizontal supports 125 at their bottoms and to side supports 123 at their tops. A cross brace 124 interconnects the side supports 123 at their midpoints. Slide blocks 126 and 128 are connected to the outer surfaces of each of the horizontal support members 125. The slide blocks 126 and 128 move along the bottom 130 of the storage body 6 in a manner which will be described subsequently.

A pair of arcuate panels 132 and 134 are fixedly held between the support members 123 and 124 and provide a pair of surfaces against which refuse is packed during filling of the storage body 6. The curvature of each of the arcuate panels 132 and 134 is controlled so that the thin metal forming the panels will resist in tension the stresses imposed on the panels by the refuse which is packed against them. With reference to the upper arcuate panel 132, the chord of the panel is shown at 136. The point of greatest distance from the chord 136 is at the midpoint of panel 132 and this distance is the chordal height 138 of the panel. The lower arcuate panel 134 has the same chordal height since the two panels 132 and 134 are the same.

The chordal height of each of the panels 132 and 134 is chosen so that the panels will resist in tension the forces imposed on them by refuse which is packed against the panels 132 and 134 during loading of the storage body 6. In addition, the length of arc of each of the panels 132 and 134 is chosen so that reduced end forces are transferred to the supporting members by the arcuate panels 132 and 134. If, for example, only a single arcuate panel was employed which had a length of arc approximately twice that of each of the individual panels 132 and 134, the support members for the panel would have to be made considerably larger to resist the higher end forces transmitted from the panel to the support members. Thus, it is a considerable advantage to utilize a plurality of separate arcuate panels in forming the ejection panel 112.

During loading of the storage body 6, the ejection panel 112 moves forwardly from a position adjacent the rearward edge 17 of the storage body to a position adjacent the forward end of the storage body. The position of the ejection panel 112 in its forward position is shown in solid line drawing in FIG. 11 and the position of the ejection panel 112 in an intermediate position is shown at 112(a) in which the ejection cylinder is shown as partially expanded at 114(a).

The position of the ejection panel 112 in its rearward position is shown at 112(b) in FIG. 12. As shown, the ejection cylinder 114 is then completely extended to the position illustrated at 114(b). With the ejection panel 112 in the position shown in FIG. 12, the storage body 6 is essentially empty.

The ejection panel occupies the position shown at 112(b) during the initial stages of the overall packing operation. As the packing progresses, the ejection panel 112 moves forwardly in short incremental movements until it reaches the position shown in solid line drawing in FIG. 11 when the storage body is completely full. In unloading the storage body 6, the tailgate 8 is pivoted upwardly about the hinge 10 between the tailgate 8 and the storage body 6, as described previously. The ejection cylinder 114 is then expanded to the position shown at 114(b) and the ejection panel 112 moves to position 112(b) to push the refuse from the storage body 6.

Figure 13:
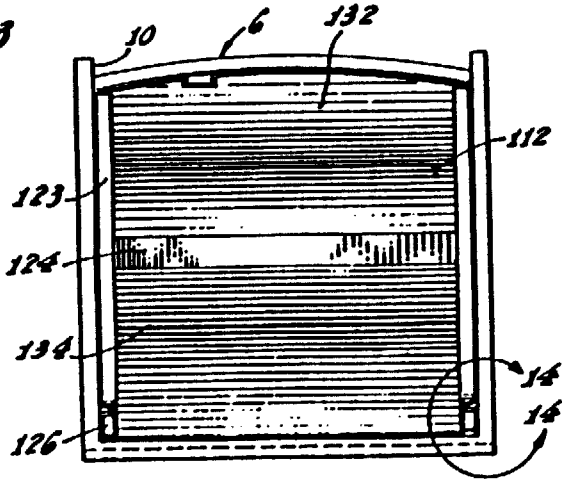
FIG. 13 is a rear elevational view of a refuse storage body with the tailgate section removed to show the ejection panel during unloading of the storage body.

Turning to FIG. 13, which is a view of the rear of the storage body with the tailgate removed, the ejection panel 112 is shown in its rearward position adjacent the opening into the storage body 6. As shown, the supports 123 are in close proximity to the side walls on either side of the storage body and the ejection panel 112 moves on the slide blocks along the floor of the storage body 6.

Figure 14:
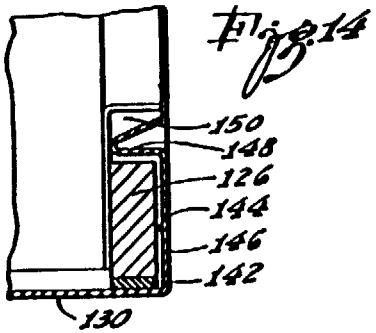
FIG. 14 is a detailed sectional view of the structure indicated by the arrow 14—14 in FIG. 13 illustrating the structure for guiding and slidably positioning the ejection panel within the storage body.

FIG. 14 is a detailed view taken along the arrows 14—14 in FIG. 13. As shown, the slide block 126 is supported on a slide plate 142 which engages the floor 130. Slide plates 142 positioned between each of the slide blocks 126 and 128 and the floor 130 are made of a hard metal which is harder than the metal of the floor 130. In usage, hard refuse materials within the storage body 6 become imbedded in the floor 130 in the areas over which the slide plates 142 move during movement of the ejection panel 112. As refuse materials become imbedded in the floor 130, a slippery surface is formed in these areas which facilitates the sliding movement of the slide blocks 142.

The floor 130 is bent up at either side to form side fold portions 146 which engage and are joined to the side walls of the storage body 6 in a manner to be described subsequently. Gaps 144 between the edge of the blocks 126 and the inner surfaces of the side fold portions 146 permits some movement of the blocks 126 from side to side to prevent binding of the blocks as they slide relative to the bottom 130. The side fold portions 146 are bent inwardly adjacent their upper ends to form guideways 148. The guideways 148 slide in grooves 150 in the sides of the ejection panel 112 and bear against the upper surface of block 126 to guide the movement of the ejection panel 112 and to prevent its tipping within the storage body 6.

Figure 15:
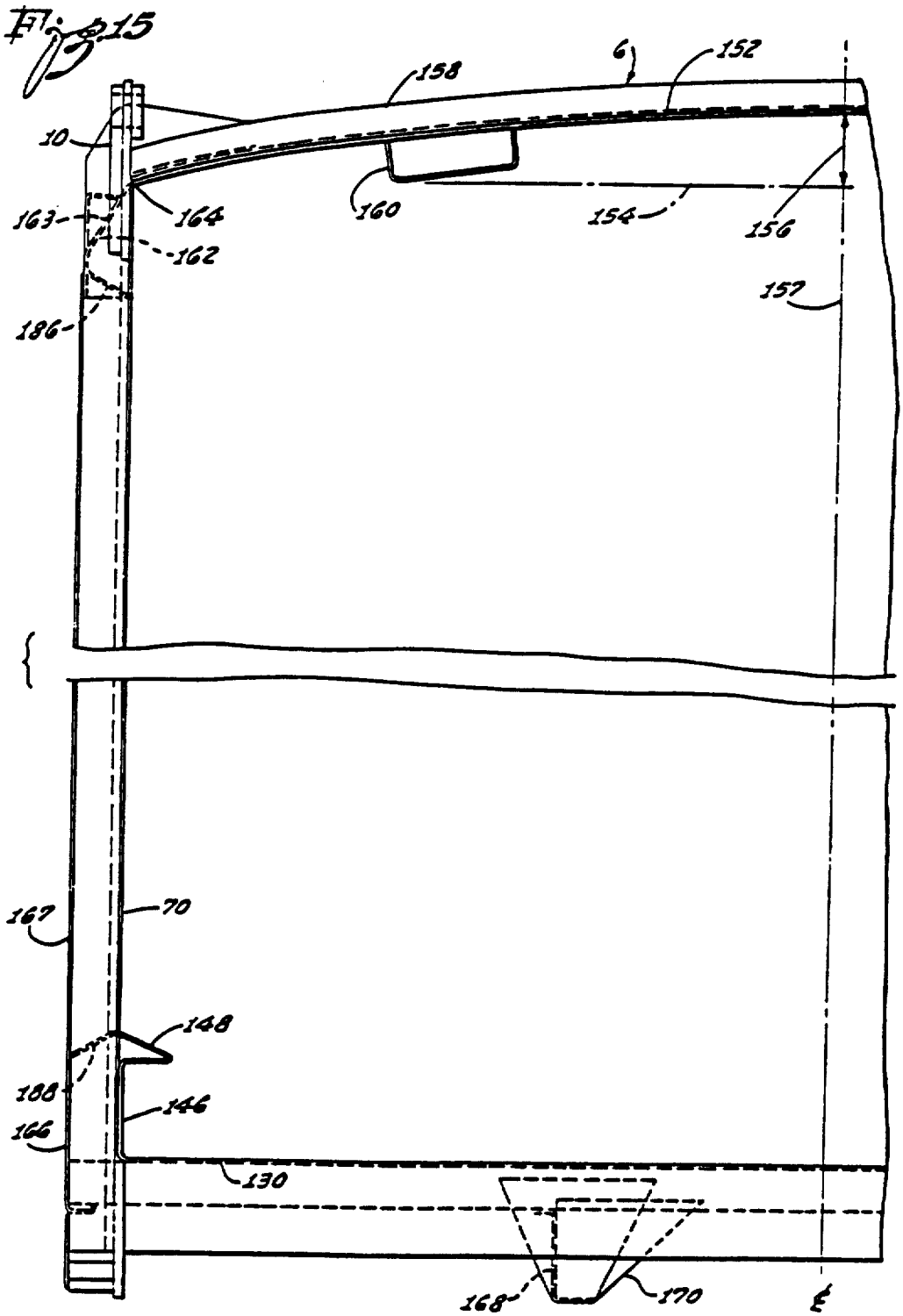
FIG. 15 is a partial end elevation of the storage body as viewed from the tailgate end with the tailgate removed.

In FIG. 15, which is an end elevational view of the storage body 6 as viewed from the rear, the storage body 6 includes a uniformly curved top 152 supported by a top support brace 158. The top 152 is joined to side walls 70 which are, in turn, joined to the bottom 130. The upper point on the curved top 152 is at the center line 157 of the body 6. The distance at the upper point, as measured from the chord 154 of the top 152 is the chordal height 156. The curvature of the top 152, as determined by the chordal height 156, is chosen so that the thin metal forming the top 152 resists in tension the side forces imposed on the top 152 by the side walls 70 during maximum loading of the storage body 6. This permits the use of thin material in forming the top 152 which does not require a reinforcing rib structure, which reduces the overall weight of the storage body 6.

The top 152 is connected to the side walls 70 along either side at a juncture line 164. A conduit channel 160 which runs longitudinally along the storage body 6 is affixed to the under surface of the top 152. The conduit channel 160 carries hydraulic lines and shields them from the extreme pressures within the storage body 6.

Angle braces 162 are positioned along either side of the storage body 6 to provide strength along the juncture lines 164. The angle braces 162 have a configuration which reduces the sharp change in contour at the juncture lines 164 between the top 152 and the side walls 70. As shown, the upper leg 163 of the angle brace 162 slopes rather gradually with respect to the contour of the top 152 where it intersects the side walls 70. This reduces the stress concentrating along the juncture lines 164. The top 152 and side walls 70 are constructed of relatively strong steel sheets such as 50,000 psi sheet material.

Turning to the lower portion of FIG. 15, the bottom 130 is bent upwardly at either side to form side fold portions 146 which are bent adjacent their upper edge to form guideways 148. The side fold portions 146 are fixedly connected to the side walls 70 to form a watertight interior dam between the side walls 70 and the bottom 130.

Fenders 166 extend down either side of the refuse body to provide structural support in the region adjacent the connection between the side walls 70 and the bottom 130. The fenders 166 have upper legs 188 which are bent inwardly to join the outer surfaces of the side walls 70. Side braces 167 are positioned vertically along either side of the refuse body 6 to provide structural rigidity. The side braces 167 are cut at an angle at their bottom ends to fit against the sloping top fender leg 188 and are cut at an angle at their top ends to fit against a sloping bottom angle leg 186. A floor support brace 168 runs longitudinally beneath the storage body 6 on either side of the center line 157. The floor support braces 168 are joined to gusset plates 170 which are positioned at intervals along the length of the braces 168 in a manner to be described.

Figure 16:
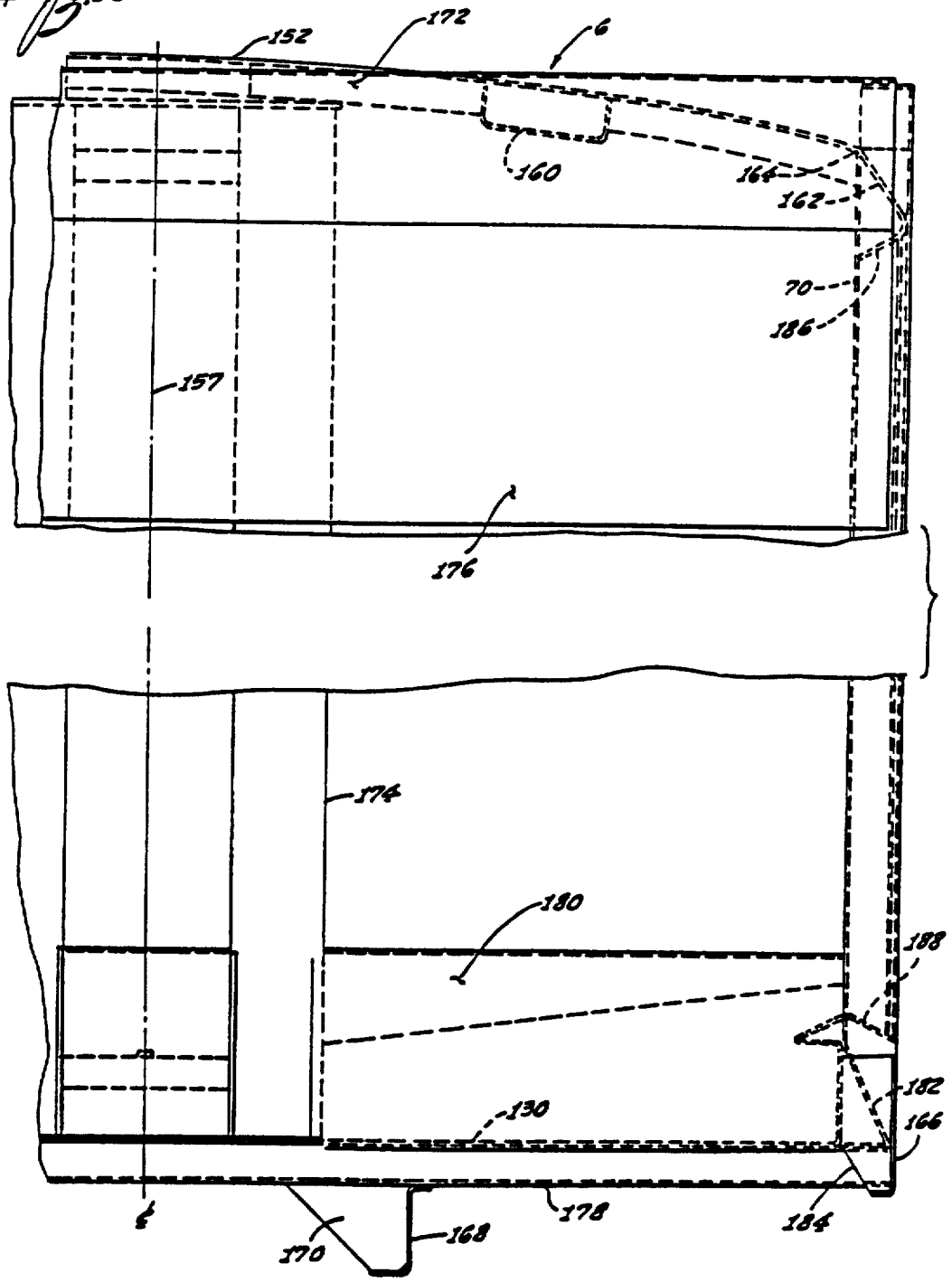
FIG. 16 is a partial end elevation of the storage body as viewed from the end adjacent the cab.
Figure 14:
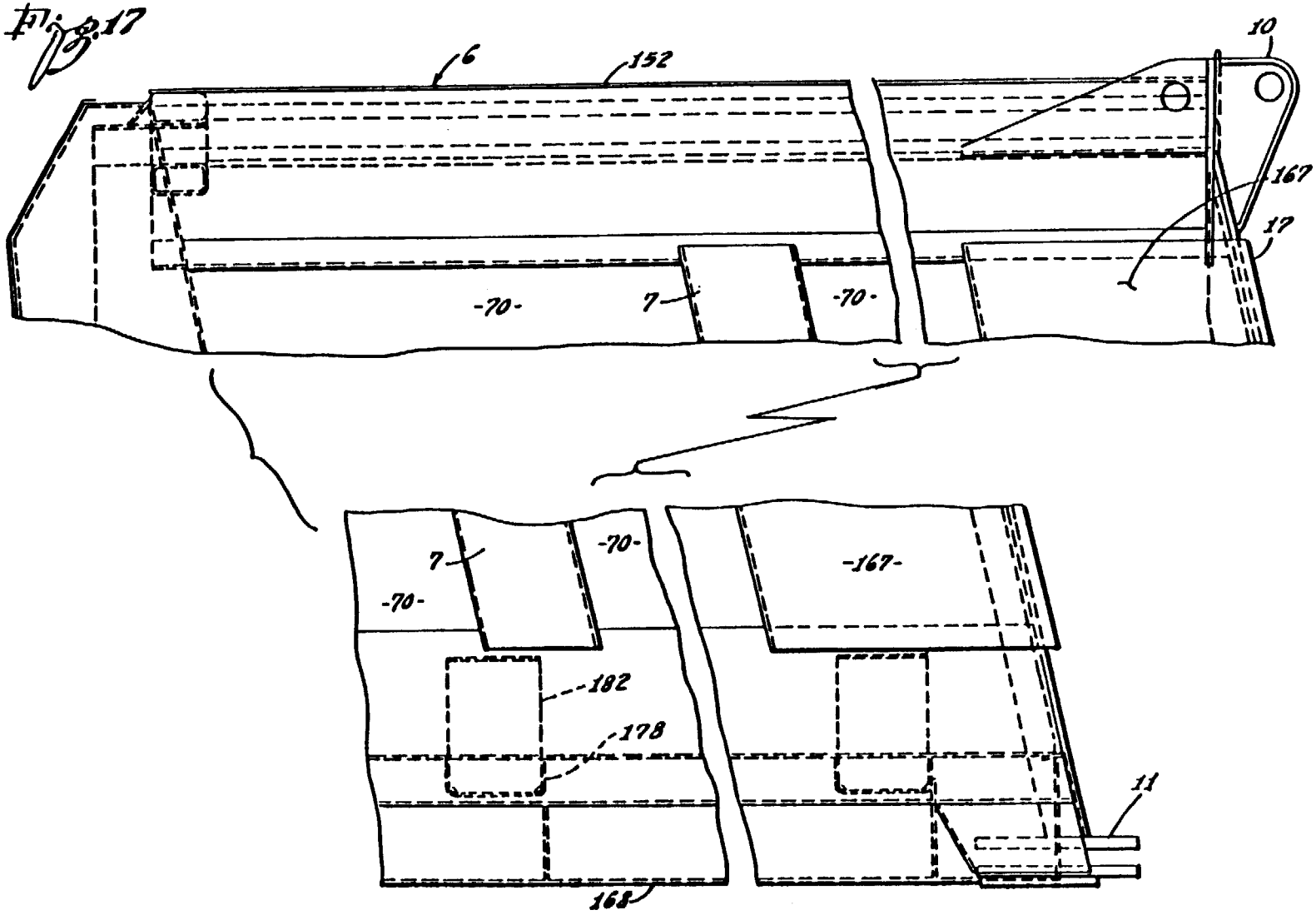

In FIG. 16, which is an end view of the storage body 6 as seen from the front, the top 152 is supported at its forward end by a support member 172 which runs between the side walls 70. The support member 172 is broken on either side of the conduit channel 160 and a pair of vertical supports 174 extend between the bottom 130 and the top support member 172 to provide vertical rigidity. An end plate 176 partially covers the ejection cylinder 114 and the ejection panel 112 and provides additional cross stability for the storage body 6. An additional end plate 180 is positioned between the side wall 70 and the vertical supports 174 and interconnects the side walls 70, the vertical supports 174, and the bottom 130.

A plurality of cross channel members 178 are positioned transversely to the longitudinal axis of the storage body 6 between the floor support braces 168 and the floor 130. The gusset plates 170 are positioned on the floor support braces 168 to support the cross channels 178 where they cross over the floor support braces 168.

Support plates 182 are positioned diagonally between the inner surface of the fenders 166 and the side walls 70 at preselected locations along the sides of the storage body as will be described. Closure plates 184 are connected to the fender ends.

Turning to FIG. 17, which is a partial side elevational view of the storage body 6 and the supporting frame, the rear edge 17 of the storage body 6 is slanted outwardly from its top to its bottom. The side brace members 167 positioned adjacent the rear edge 17 are slanted at the same angle as the rear edge 17. Moving forwardly along the side of the storage body 6, a plurality of side braces 7 (see FIG. 1) are positioned along the side walls 70 of the storage body 6. Each of the side brace members 7 is also slanted at the same angle as the rear edge 17 with the distance between the side braces 7 being progressively increased in moving from the rear edge 17 toward the front of the storage body 6. Cross channels 178 are positioned transversely at the location of each side brace 7 and also at the location of the side braces 167 adjacent the rear of the storage body 6. Each of the cross channels 178 supports the bottom 130 of the storage body 6 and the cross channels 178 are, in turn, supported by the floor support members 168 running longitudinally of the storage body 6.

In supporting the cross channels 178 (see FIG. 16), gusset plates 170 are tied to the floor support brace 168 at the locations where the cross channels 178 pass over the supports 168. Support plates 182 fit within the cross channels 178 and are positioned diagonally to tie into the side walls 70. The support plates 182 provide additional support for the side braces 7 and the side braces 167. The side braces 7 are connected at their upper ends to the angle braces 162 which run along either side of the storage body 6 adjacent the juncture 164 between the top 152 and the side wall 70. The bottom ends of the side braces 7 are connected to the fenders 166 which run along the side walls 70 adjacent the connection between the side walls 70 and the bottom 130. The upper ends of the side braces 7 are cut at an angle to join the bottom leg 186 of the angle brace 162 while the bottom ends of the side braces 7 are cut at an angle to join the top leg 188 of the fender 166. FIGS. 15 and 16 illustrate the position of the angle braces 162 and the fenders 166 which tie into the side braces 7. By positioning the side braces 7 at an angle, such as 13 degrees from the vertical, the braces 7 support a larger area of the side walls 70 against side loading. The storage body 6 is both strong and yet relatively light as compared with storage bodies employed in previous refuse collection apparatus. This permits a reduction in the overall weight of the present apparatus with the result that is it easier to use, for example, on the streets of residential neighborhoods.

Figure 18:
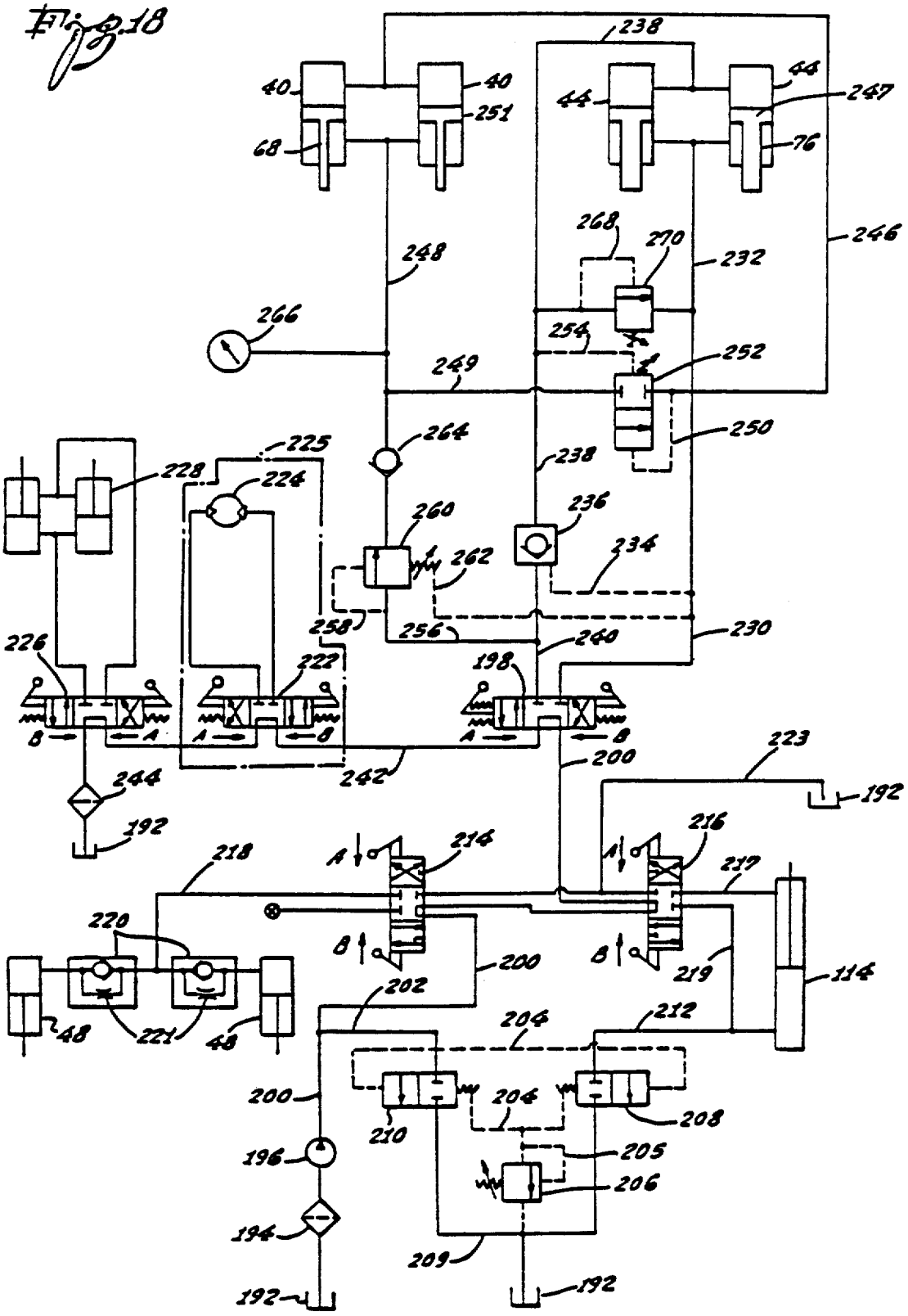
FIG. 18 is a schematic drawing illustrating the hydraulic circuitry employed in actuation of the packing panels, the ejector panel, and auxillary equipment.

The hydraulic circuitry which I employ in operation of my apparatus is illustrated schematically in FIG. 18. Hydraulic fluid is drawn from a sump 192 through a strainer 194 by a pump 196. A number of sumps 192 are shown for purposes of convenience in illustration. However, it should be understood that the sump 192 is generally a single container which supplies oil for the operation of the hydraulic circuitry and also receives oil which is returned from the hydraulic circuitry.

Leading from the pump 196 is an input line 200 which is joined to a branch line 202 inward from the pump 196. The branch line 202 leads to a valve 210. The ejection cylinder 114 is connected by a line 212 to a valve 208 and both valves 208 and 210 lead to the sump 192. In operation, the valves 208 and 210 are controlled by a relief valve 206. The relief valve functions in response to the pressure in pilot lines 204 which pass through the valves 208 and 210 to the relief valve 206. When the pressure in the pilot lines 204, which is the pressure in the input line 200, reaches a predetermined value, the relief valve 206 is opened by the pressure acting through a control line 205. This causes the valves 208 and 210 to open and hydraulic fluid in line 200 then passes through line 202 and valve 210 to a line 209 to the sump 192. At the same time, hydraulic fluid from the ejection cylinder 114 passes through line 212 and valve 208 to line 209 and the sump 192.

Preferably, the pressure which actuates the relief valve 206 is set at or very close to the maximum operating pressure for the hydraulic system. When the pressure then drops to a fixed lower pressure, the relief valve 206 automatically closes. As hydraulic fluid is withdrawn from the ejection cylinder 114 to the sump 192, the hydraulic cylinder 114 shortens an incremental distance to cause an incremental movement of the ejection panel 112. The movement of the ejection panel 112 is illustrated in FIGS. 11 and 12 showing the incremental forward movement of panel 112 as the storage body 6 is progressively packed with refuse under high pressure.

The setting of the relief valve 206 to open at a pressure which is at or near the maximum operating pressure of the hydraulic system insures that the system operates constantly at pressures which are close to the maximum operating pressure. When this pressure is exceeded during packing, the pressure drops momentarily as hydraulic fluid is withdrawn from both the ejection cylinder 114 and the main input line 200. However, since the relief valve 206 is not open for a long period of time, the pressure in the hydraulic system does not drop very far from its maximum operating pressure as the packing operation proceeds. Thus, each packing cycle is conducted under a high and relatively constant packing pressure near the maximum system pressure in uniformly compacting refuse within the storage body 6.

The main input line 200, after leaving the pump 196, passes to a main control valve 198. To begin the packing operation, as illustrated earlier with regard to FIGS. 4–7, the main control valve 198 is moved from its neutral position shown in FIG. 18 in the direction of the arrow denoted A. When this occurs, hydraulic fluid is then fed through lines 230 and 232 to the undersides of a pair of pistons 247 in hydraulic cylinders 44. Piston rods 76 attached to the undersides of pistons 247 are relatively large in diameter to provide a small area on the undersides of pistons 247 which is contacted by hydraulic fluid. This provides a quick upward movement of the pistons 247 to produce a quick rearward rotation of the lower packing panel 24 to the position shown in FIG. 5.

A pilot line 234 leads to a pilot operated check valve 236. The check valve 236 is set to open at a relatively low pressure in line 230 to permit the flow of fluid in cylinders 44 through a line 238 and valve 236 to a line 240. Hydraulic fluid is, thus, withdrawn from the upper sides of pistons 247 and fed through valve 198, line 242, a strainer 244, to the sump 192.

After contraction of the hydraulic cylinders 44 with the valve 198 remaining in the direction of the arrow A, hydraulic fluid is fed through a line 246 to the upper sides of the pistons 251 within hydraulic cylinders 40. As hydraulic fluid is fed to cylinders 40 through line 246, fluid is withdrawn from the undersides of the pistons 251 through line 248. This fluid passes through a line 249 to a valve 252. The valve 252, which is normally in a closed position, is opened by the pressure in a pilot line 250 which reflects the pressure in the line 246. Pilot fluid passing through valve 252 exits from the valve through a return line 254. Valve 252 is set to open at a higher pressure than the valve 236. Thus, valve 252 will not normally be open during the contraction of the hydraulic cylinders 44.

The hydraulic fluid passing from line 249 through valve 252 joins the fluid being fed to the hydraulic cylinders 40 through line 246. Thus, there is established a regenerative loop to cylinders 40 which includes lines 248 and 249, valve 252 and line 246. By establishing a regenerative loop for the hydraulic cylinders 40, the effective area on the upper surfaces of pistons 251 acted upon by hydraulic fluid is equal to the diameter of the piston rods 68 attached to the undersides of the pistons 251. Since this area is relatively small, the extension of the cylinders 40 and the downward movement of the piston rods 68 is relatively quick to provide a quick downward movement of the upper packing panel 22 as illustrated in FIG. 6.

After extension of the hydraulic cylinders 40, the valve 198 is moved to its opposite position in the direction of the arrow B. Hydraulic fluid entering through the valve 198 is then fed through line 240, check valve 236 and line 238 to the upper sides of the pistons 247. Since the entire upper surface of the pistons is being pressurized, the movement of the pistons 247 is relatively slow. As the pistons 247 move downwardly with considerable force, hydraulic fluid is withdrawn from the undersides of the pistons 247 through lines 232 and 230 and passes through the valve 198 and line 242 to the sump 192. During downward movement of the pistons 247, the lower packing panel 24 is rotated forwardly through the hopper 12 as illustrated in FIG. 7. The resistance to movement of the lower packing panel 24 may be relatively high as it passes through the hopper 12 to compact refuse between its curved packing surface 90 and the vertically inclined forward packing surface 16 of the hopper. Thus, the movement of the panel 24 is relatively slow and a high rotational force is exerted on the panel 24 by the extension of the hydraulic cylinders 44.

After the cylinders 44 have been extended and with the valve 198 held in the direction of the arrow B, hydraulic fluid is then fed from line 240 into a line 256. The flow of hydraulic fluid through line 256 is impeded by a valve 260 which is normally in a closed position. When the pressure of fluid in line 256 builds up to a predetermined high level that is slightly less than the pressure which opens the relief valve 206, the pressure is transmitted through a pilot line 258 to open the valve 260. The pilot fluid flowing through valve 260 is withdrawn through a pilot return line 262.

On opening of the valve 260, hydraulic fluid under relatively high pressure is fed through a check valve 264 and line 248 to the undersides of pistons 251. This causes the hydraulic cylinders 40 to contract. During contraction, hydraulic fluid is withdrawn from the upper sides of the pistons 251 through line 246 and passes through line 230 and valve 198 to the sump 192. The contraction of the cylinders 40 is a relatively slow movement during which great force is applied to the upper packing panel 22 in its upward movement as illustrated in FIG. 7.

During upward movement of the upper panel 22 and contraction of the hydraulic cylinders 40, the lower packing panel 24 is held in the position illustrated in FIG. 7 by the extension of the hydraulic cylinders 44. Since the valves controlling the flow of fluid from cylinders 44 through line 238 are closed during this period, the pressure can build up within the hydraulic cylinders 44 due to the forces exerted by refuse against the curved packing surface 90 of the lower panel 24. These forces are transmitted to the hydraulic fluid in the cylinders 44 through the piston rods 76 connected to the lower panel 24. To prevent rupture of the hydraulic cylinders 44 as a result of these static pressures, a pilot operated relief valve 270 is provided which operates through the pressure in a pilot line 268 that transmits the pressures within the hydraulic cylinders 44. The relief valve 270 may be set to open, for example, at a pressure of 2,500–3,000 psi, or any other suitable pressure, depending upon the design of the hydraulic cylinders 44. On opening of the relief valve 270, hydraulic fluid passes through the valve to reduce the pressures in the cylinders 44. This fluid is carried through line 230 and valve 198 to the sump 192.

An auxiliary gauge 266 may be connected to line 248 to indicate the pressure in the hydraulic cylinders 40 during their contraction in raising the upper packing panel 22. By noting these pressures, the efficiency of the packing operation can be determined.

After contraction of the hydraulic cylinders 40 to raise the panel 22 to its upper position, the valve 198 is returned to its neutral position as shown in FIG. 18. When this occurs, one packing cycle has been completed.

As shown in FIG. 18, various auxiliary equipment may be actuated by the hydraulic pressures generated by the pump 196. During actuation of the auxiliary hydraulic equipment, the valve 198 is in its neutral position. A valve 214 is utilized to operate the hydraulic cylinders 48 for raising and lowering of the tailgate 8 with respect to the storage body 6. When the valve 214 is moved from its neutral position in the direction of the arrow A, hydraulic fluid is fed through line 218 and valves 220 to the upper sides of the cylinders. This causes raising of the tailgate 8. During lowering of the tailgate, the valve 214 is moved to its opposite side in the direction of the arrow B. Hydraulic fluid then flows around the valves 220 through constricted bypasses 221 and is transmitted to the sump 192 through a line 223. After lowering of the tailgate 8, the valve 214 is returned to its neutral position.

A valve 216 is used to either expand or contract the ejection cylinder 114. When the valve 216 is moved in the direction of the arrow A, the hydraulic cylinder is contracted by feeding hydraulic fluid through a line 217 while withdrawing fluid to the sump 192 through a line 219. When the valve 216 is moved in the direction of arrow B, the cylinder 114 is expanded by feeding fluid through line 219 and withdrawing fluid to sump 192 through line 217.

A valve 222 is used to operate a winch 224. By moving valve 222 in the direction of arrow B, the winch is rotated in one direction, for example, to lift heavy containers to dump their contents into the hopper 12. By moving the valve 222 in the direction of the arrow A, the winch 224 may be rotated in the opposite direction, e.g., to lower the container after its contents have been dumped.

A pair of auxiliary hydraulic cylinders 228 may be operated by movement of a valve 226. On movement of the valve 226 in the direction of the arrow A, the hydraulic cylinders 228 may be expanded while on movement of the valve in the direction B, the cylinders 228 may be contracted. Auxiliary hydraulic cylinders such as 228 may be utilized for example, to operate a fork lift device positioned at the rear of the tailgate 8 to lift heavy containers. As indicated at 225, the winch 224 and valve 222 may be supplied as a unit which is plumbed into the overall hydraulic circuit by connecting valve 222 into line 242.

In the movement of the upper panel 22 and the lower panel 24 through a complete packing cycle, as described in FIGS. 4–7 and 18, it is necessary to move the valve 198 in the direction of arrow A to begin the cycle. The valve 198 remains in this position during the first half of the cycle when the lower panel 24 is rotated rearwardly and the upper panel 22 is moved downwardly and rearwardly. For the next half of the packing cycle, it is necessary to move the valve 198 in the direction of the arrow B in FIG. 18. The valve 198 remains in this position as the lower packing panel 24 is moved through the hopper 12 and the upper packing panel 22 is raised to its upward position. When the upper packing panel 22 reaches its upward position, it is then necessary to return the valve 198 to its neutral position to terminate the packing cycle.

It is desirable that the necessary movements of the valve 198 during the packing cycle be carried out automatically. This may be accomplished by the mechanism shown in FIG. 19 which is a view of an outer side of the tailgate with the cover plate 13 removed. To begin the packing cycle, a handle 272 is pulled outwardly away from the side wall 19 and then pushed forwardly over a stop 273. The handle 272 is pivotally mounted at 274 and, thereby, imparts a counterclockwise movement to an arm 276 connected to the handle. The arm 276 is pivotally connected at 280 to a rod 278 and imparts a downward movement to the rod. With downward movement of the rod 278, a force is transmitted at right angles through a joint 286 connected to a bell crank or other suitable mechanism, not shown, to move the valve 198 in the direction of the arrow A. This begins the packing cycle, as previously described.

As rod 278 moves downwardly, a force is transmitted through an arm 282 that is pivotally connected to the rod 278 at 284. The arm 282 is pivotally mounted at 284 in line with a second arm 288. Movement of the arm 282 in a counterclockwise direction causes a corresponding counterclockwise movement of the arm 288 which, acting through a spring 292, causes counterclockwise rotation of an arm 294 about a pivotal mounting 296. As the arm 294 moves, a rod 298 pivotally connected to arm 294 at 295 is moved upwardly. The lower end of rod 298 is pivotally connected at 300 to an arm 302 which is pivotally mounted at 304. Thus, as the arm 298 is pulled upwardly, the arm 304 is rotated upwardly. Counterclockwise rotation of the arm 282 on downward movement of the rod 278 also causes counterclockwise rotation of an arm 290 which relieves the tension in a spring 310. This permits counterclockwise rotation of an arm 306 which is pivotally mounted on a support 308.

At the beginning of the packing cycle, the upper packing panel 22 is in a raised position as shown in FIG. 4 and a stub shaft 26 extends through a slot or opening 60 in a side wall 19 of the tailgate 8. With the upper panel 22 in a raised position, the stub shaft 26 is positioned near the top of the slot 60. The stub shaft 26 is shown in this position in FIG. 19.

After beginning the packing cycle by moving the arm 272 forward and moving the valve 198 in the direction of arrow A, the upper panel 22 is lowered which causes the stub shaft 26 to move downwardly within the slot 60 and to strike the arm 302, causing it to rotate in a counterclockwise direction. On rotation of the arm 302, the rod 298 is pulled downwardly. This places the spring 292 in tension, causes arm 282 to rotate in a clockwise direction, and causes an upward movement of rod 278. The upward movement of rod 278 is transmitted at right angles through a bell crank or other suitable means to the valve 198, thereby causing it to move in the direction of the arrow B for the last half of the packing cycle.

Figures 19, 20:
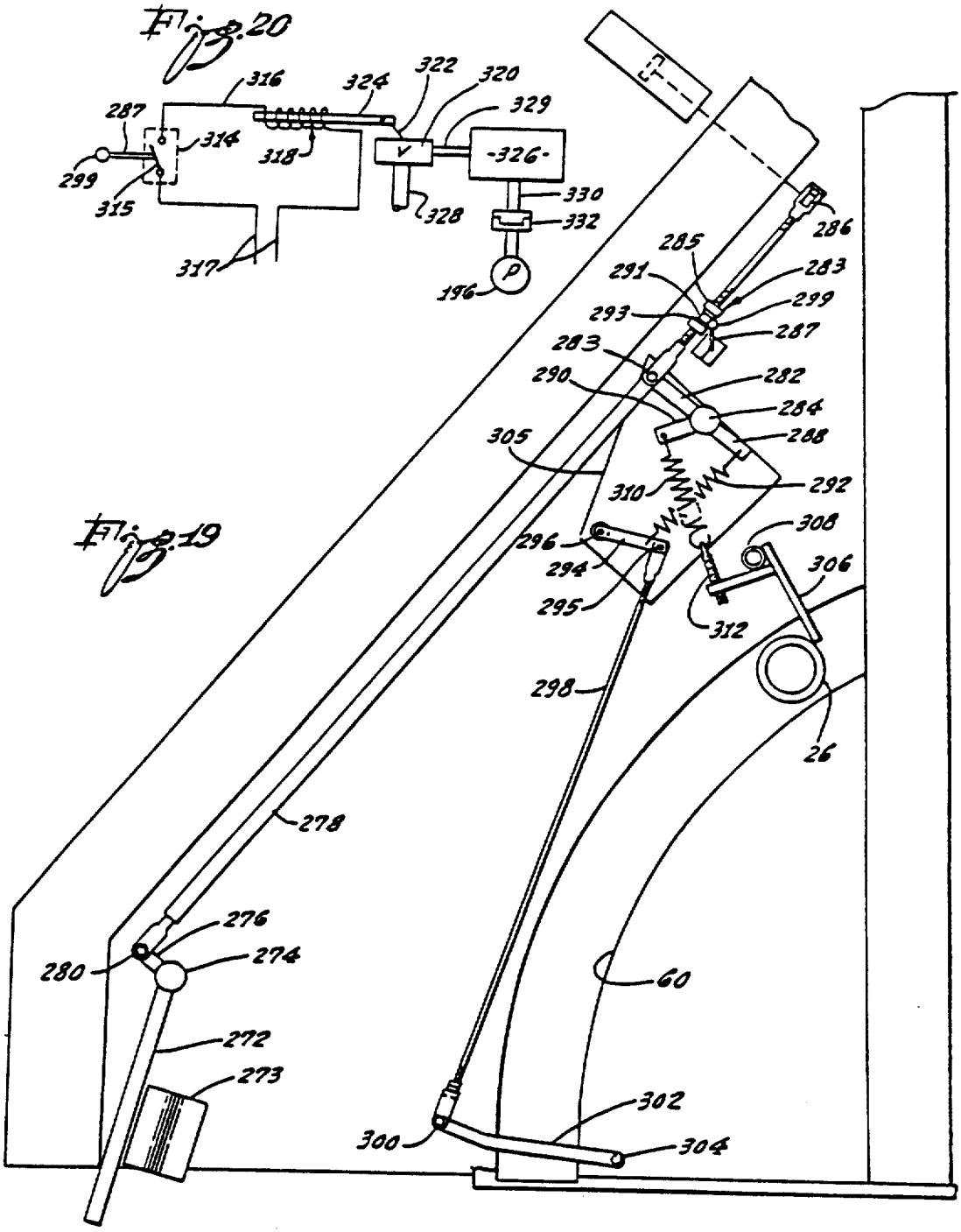
FIG. 19 is a partial side elevational view of the tailgate illustrating the control linkage used in automatically cycling the packing panel through a packing cycle.
FIG. 20 is a schematic drawing illustrating the electrical circuit for controlling the power input from the truck engine to the pump during the packing cycle.

During the last half of the packing cycle, the upper packing panel 22 is moved upwardly which causes the stub shaft 26 to again move upwardly in the slot 60. When the upward movement of the panel 22 is essentially complete, the stub shaft 26 strikes the arm 306 and causes it to rotate in a counterclockwise direction. As arm 306 rotates, it acts through the spring 310, arm 290 and arm 282 to cause a downward movement of the rod 278. The downward movement of rod 278 causes the valve 198 to return to its neutral position. The position of the rod 278 and handle 272 with valve 198 in a neutral position is as shown in FIG. 19.

An adjusting screw 312 may be used to vary the tension in the spring 310. Also, if desired, adjusting means may be utilized with the other spring 292 to adjust its tension.

An actuator 283 positioned on the rod 278 selectively engages a switch during movement of the rod 278. The actuator 283 includes enlarged ends 285 and 293 separated by a valley 291 and a roller 299 is mounted on the end of the arm 287. When the valve 198 is in its neutral position, the roller 299 lies in the valley 291 and the switch is open. As the rod 278 moves downwardly to shift valve 198 in the direction of the arrow A, the roller 299 moves into contact with the enlarged end 285 to move switch arm 287 and close the switch. With the switch closed, an electrical signal is sent through conventional circuitry to a solenoid on the truck engine which increases the fuel to the engine to provide additional power for operation of the pump 196 that is driven by the truck engine.

At the end of the first half of the packing cycle, the rod 278 is moved upwardly to move valve 198 in the direction of the arrow B. As this occurs, the roller 299 moves into contact with enlarged end 293 which maintains the switch in a closed position to provide additional fuel to the truck engine during the last half of the packing cycle. When the rod 278 is again moved downwardly at the end of the packing cycle to return valve 198 to its neutral position, the roller 299 moves into contact with the valley 291 to open the switch and to cut off the supply of additional fuel to the truck engine. A mounting plate 305, which supports a portion of the actuating linkage, is affixed to the side of the tailgate 8 to properly position the actuating linkage on the tailgate 8. As described, the various functions of the packing mechanism for my apparatus are controllable by movement of a single rod 278. This provides a greater ease of control than in previous refuse loading equipment which required the movement of several handles in cycling of the packing mechanism.

The manner in which the power to the pump 196 may be varied during the packing cycle is illustrated in FIG. 20. Movement of the switch arm 287 and roller 299 by the position. of rod 278, as described previously, controls the opening and closing of a switch 314. When the roller 299 engages the enlargements 285 or 293, the arm 287 moves a throw 315 of switch 314 to a closed position and when the roller 299 engages the valley 291 (see FIG. 19), the throw 315 is in an open position as shown in FIG. 20. With the throw 315 in a closed position, electricity from input lines 317 flows through switch 314 and through a conductor 316 to a solenoid 318 having a push rod 324. Passage of current through the coil of solenoid 318 causes the push rod 314 to move a valve lever 322 which controls a valve 320. The valve 320 regulates the flow from a fuel input line 328 into a valve output line 329 to an engine 326. The engine is operatively connected through a drive 330 to the pump 196 and clutch means 332 may be provided for disengaging or engaging the drive 330 to transmit power from engine 326 to the pump 196. With clutch means 332 engaged, movement of valve lever 322 by push rod 324 increases the supply of fuel to the engine 326 which causes an increase in the power supplied to pump 196. Thus, when the valve 198 (FIG. 18) is in the position of either arrow A or arrow B during the packing cycle, the roller 299 is in engagement with enlargements 285 or 293 and switch 314 is closed to supply additional fuel to engine 326. This provides additional power to pump 196 to provide power for operation of the packing mechanism.

The presence of a bulky piece of refuse within the hopper 12 may, under some circumferences, cause the packing mechanism to jam during a packing cycle. Jams do not occur often; however, to protect the packing mechanism, it is necessary that the apparatus be equipped to handle jams.

If a jam occurs when the lower packing panel 24 has been rotated rearwardly and the upper panel 22 is moving downwardly and rearwardly, the jam can be alleviated by pulling the handle 272 rearwardly and thereby moving the valve 198 to position B. When this is done, the lower panel 24 begins its forward rotation through contraction of the hydraulic cyclinders 44 to eliminate the jam. When the handle 272 is pulled rearwardly the rod 278 moves downwardly from its position shown in FIG. 19 which expands the spring 292 and places it in tension without rotation of the arm 302. Thus, when the jam has been cleared and the handle 272 is released, the spring 292 pulls the arm 288 downwardly which pushes rod 278 upwardly and returns valve 198 in the direction of the arrow A. The upper panel 22 then proceeds to again move downwardly with the lower panel in a partially rotated forward position. When the upper panel 22 reaches its lowered position, the stub shaft 26 engages arm 302 to rotate it in a counterclockwise direction and to thereby move rod 278 upwardly and to move valve 198 in the direction of arrow B. With valve 198 in the direction of arrow B, the lower panel 24 completes its forward rotation and the upper panel 22 then moves forwardly and upwardly during the last half of the packing cycle.

In clearing a jam which occurs during downward movement of the upper panel 22, the handle 272 may be moved back and forth, as desired, in moving valve 198 in the direction of arrow B, then in the direction of arrow A, etc. until the jam is cleared.

This will result in switching from the first half of the packing cycle to the second half of the packing cycle and back again, etc. in moving the upper panel 22 and lower panel 24 to clear the jam.

A further situation where jams can occur is during the forward rotation of the lower panel 24 in moving through the hopper 12 when the valve 198 is shifted in the direction of arrow B. With reference to FIG. 18, if the lower panel 24 encounters an obstruction, this causes a pressure buildup in lines 240, 238 and 256. When the pressure in line 256 builds up to a sufficient extend to open the valve 260, the hydraulic cylinders 40 begin to contract which raises the upper panel 22. When panel 22 has raised to a sufficient extent for the lower panel 24 to pass over the object causing the jam, the pressure in line 238 then causes the cylinders 44 to complete their expansion and the lower panel 24 to complete its forward rotation. As the pressure in line 240 is thus transmitted to cylinders 44, there is a drop in the pressure in line 256 which causes valve 260 to close and the movement of cylinders 40 to cease. When the cylinders 44 have completed their expansion, pressure is then transmitted through line 256 and valve 260 to complete the contraction of cylinders 40 and the raising of the upper packing panel 22.

If desired, the valve 198 can be moved in the direction of arrow A in relieving a jam occurring during forward rotation of the lower panel 24. This would cause rearward rotation of the lower panel 24 with the lower panel 24 then rotating forwardly when the valve 198 is again moved in the direction of arrow B. Normally, as explained above, it is not necessary to move the valve 198 in relieving a jam which occurs during forward rotation of panel 24. Relief of the jam normally occurs through raising of the panel 22 which occurs automatically due to pressure buildup in line 256.

In a third situation where jams can occur, the upper panel 22 is moving forwardly and upwardly during the last half of the packing cycle while the lower panel 24 is held in a forwardly-rotated position as shown in FIG. 7. With the lower panel 24 thus held in a fixed position, the valve 236 (FIG. 18) is closed and hydraulic fluid within cyclinders 44 is trapped within the volume of the upper surfaces of the pistons 247. The pressure of the hydraulic fluid within cylinders 44 during this situation is determined by the forces transmitted to the fluid by the piston rods 76 due to the pressure of refuse bearing against the lower panel 24. To prevent the rupture of cylinders 44 when a jam occurs during raising of the upper panel 22, the relief valve 270 is set to open at a predetermined pressure. This permits hydraulic fluid to drain through the relief valve 270 to the sump 192 which results in a partial rearward rotation of the lower panel 24. The rearward rotation of panel 24 permits the panels 22 and 24 to be raised while clearing the object which is causing the jam.

As described, my apparatus provides a greatly improved means of packing refuse. The terms "convex" or "convexly" used in describing the movement of the upper panel 22 are not used in a precise geometrical sense. Rather the terms are used to describe the slope of the path of movement which becomes more horizontal during raising of the panel. This provides a high horizontal force component to the panel toward the end of the packing cycle when the packing resistance is highest without the use of a relatively long tailgate structure. The movement of the upper and lower panels 22 and 24 provided by the upper and lower links 30 and 28 permits a lateral floating action to alleviate the affects of unbalanced loading on the panels. This is a considerable improvement over previous refuse loading equipment in which movement of the panels along a fixed, inflexible path was largely controlled by the shape of grooved or slotted guideways in the tailgate structure that received rollers carried by the panels with the rollers following along the guideways during movement of the panels.

I claim:

1. In a refuse collector, hopper means for storing the refuse, the hopper means having a rear wall, a substantially vertically disposed forward wall spaced from the rear wall and a bottom wall extending substantially horizontally between the rear wall and the forward wall, fixed panel means spaced upwardly from the forward wall of the hopper means and disposed relative to the forward wall to define an opening through which the refuse is removed and to provide for the forward movement of the refuse through the opening, packer panel means initially movable forwardly relative to the hopper means from the rear wall toward the forward wall in abutting relationship to the bottom wall to provide for a horizontal packing of the refuse against the forward wall of the hopper means *by a scooping movement* and subsequently movable substantially vertically upwardly relative to the hopper means and the fixed panel means and in abutting relationship to the forward wall of the hopper means to provide for a vertical packing of the refuse against the fixed panel means and a horizontal movement of the refuse through the opening *by at least a scooping movement*, and control means operatively coupled to the packer panel means for initially producing a forward movement of the packer panel means relative to the hopper means from the rear wall toward the forward wall to obtain the horizontal packing of the refuse against the forward wall of the hopper means and for subsequently producing a movement of the packer panel means upwardly relative to the hopper means and the fixed panel means to obtain the vertical packing of the refuse against the fixed panel means.

2. In a refuse collector as set forth in claim 1, the fixed panel means being shaped and disposed at an inclined angle relative to the packer panel means to obtain a forward movement of the refuse through the opening during the upward movement of the packer panel means relative to the hopper means and the fixed panel means.

3. In a refuse collector as set forth in claim 1, means disposed on the packer panel means to facilitate the retention of the refuse in packed form after the forward movement of the packer panel means and after the upward movement of the packer panel means.

4. In a refuse collector as set forth in claim 1, the packer panel means and the forward wall of the hopper means being shaped relative to each other to prevent refuse from becoming jammed between the packer panel means and the hopper means during the upward movement of the packer panel means relative to the hopper means.

[5. In a refuse collector, hopper means for storing the refuse, the hopper means having a substantially vertically disposed rear wall, a substantially vertically disposed forward wall spaced from the rear wall and a substantially horizontally disposed bottom wall extending between the rear wall and the forward wall, pl fixed panel means spaced upwardly from the forward wall and disposed relative to the forward wall to define an opening through which the refuse is moved and to provide for a forward movement of the refuse through the opening, packer panel means movable initially downwardly relative to the hopper means in abutting relationship to the rear wall to provide initially for a shearing of any refuse overhanging the rear wall of the hopper means and subsequently forwardly relative to the hopper means in abutting relationship to the bottom wall to provide for a forward packing of the refuse against the forward wall of the hopper means and subsequently upwardly relative to the hopper means and the fixed panel means in abutting relationship to the forward wall to provide for a vertical packing of the refuse against the fixed panel means and to provide for a forward movement of the refuse through the opening, and control means operatively coupled to the packer panel means for initially producing a downward movement of the packer panel means relative to the hopper means in abutting relationship to the rear wall to facilitate shearing of any refuse overhanging the rear wall of the hopper means and for subsequently producing a forward movement of the packer panel means relative to the hopper means from the rear wall toward the forward wall in abutting relationship to the bottom wall to obtain the horizontal packing of the refuse against the forward wall of the hopper means and for subsequently producing a movement of the packer panel means upwardly relative to the hopper means and the fixed panel means in abutting relationship to the forward wall to obtain the vertical packing of the refuse against the fixed panel means and to obtain the forward movement of the refuse through the opening.]

[6. In a refuse collector as set forth in claim 5, the fixed panel means being shaped relative to the packer panel means and being inclined relative to the forward wall to obtain a forward movement of the refuse through the opening during the upward movement of the packer panel means relative to the hopper means and the fixed panel means.]

[7. In a refuse collector as set forth in claim 5, the fixed panel means and the packer panel means being shaped relative to each other and the fixed panel means being disposed relative to the packer panel means to provide a wiping action between the fixed panel means and the packer panel means during the upward movement of the packer panel means for facilitating the removal of refuse from the packer panel means.]

[8. In a refuse collector as set forth in claim 5, the packer panel means being reinforced and being provided with a reinforced edge to facilitate shearing of any refuse overhanging the rear wall of the hopper means when the packer panel means moves along the rear wall of the hopper means.]

[9. In a refuse collector as set forth in claim 5, the packer panel means and the forward wall of the hopper means being shaped relative to each other to prevent refuse from becoming jammed between the packer panel means and the hopper means during the upward movement of the packer panel means relative to the hopper means.]

10. In a refuse collector, hopper means for storing the refuse, the hopper means having a forward wall and having a bottom substantially horizontal wall terminating in the forward wall at its forward end, fixed panel means spaced upwardly from the forward wall and disposed relative to the forward wall to define an opening through which the refuse is moved forwardly, upper packer panel means movable substantially vertically upwardly relative to the fixed panel means to produce a wiping of refuse from the upper packer panel means by the fixed panel means, the fixed panel means being shaped relative to the upper packer panel means to facilitate the movement of the refuse forwardly through the opening during the movement of the refuse against the fixed panel means by the upward movement of the upper packer panel means, lower packer panel means movable substantially horizontally relative to the hopper means in abutting relationship to the bottom wall of the hopper means to obtain a horizontal packing of the refuse against the forward wall of the hopper means *by a scooping movement* and movable substantially vertically upwardly with the upper packer panel means in abutting relationship to the forward wall of the hopper means to obtain a vertical packing of the refuse against the hopper means and the fixed panel means and a forward movement of the refuse through the opening, means pivotally connecting the upper packer panel means and the lower packer panel means to provide for the horizontal movement of the lower packer panel means in abutting relationship to the bottom wall of the hopper means, first drive means operatively coupled to the upper packer panel means for providing controlled upward movements of the upper packer panel means and the lower packer meals to provide for the upward movement of the refuse against the fixed panel means and the movement of the refuse forwardly through the opening, second drive means operatively coupled to the lower packer panel means for producing controlled horizontal movements of the lower packer panel means independently of any movements of the upper packer panel means to provide for the horizontal packing of the refuse, and control means operatively coupled to the first and second drive means for providing controlled operations of the drive means.

11. In a refuse collector as set forth in claim 10, the control means initially providing an operation of the first drive means to produce downward movements of the upper and lower packer panel means relative to the hopper means, a subsequent operation of the second drive means to provide a forward movement of the lower packer panel means relative to the hopper means to obtain a horizontal packing of the refuse and thereafter an operation of the first drive means in a direction opposite to the initial operation of the first drive means to obtain a vertical packing of the refuse and a wiping of the refuse from the upper packer panel means.

[12. In a refuse collector, hopper means for storing the refuse, the hopper means including a forward wall having a substantially vertical disposition, fixed panel means spaced upwardly from the forward wall and disposed relative to the forward wall to define an opening through which the refuse is moved forwardly, packer panel means movable relative to the forward wall of the hopper means and the fixed panel means to provide a substantially vertical packing of the refuse in the hopper means against the fixed panel means and to provide a forward movement of the refuse through the opening, and means operatively coupled to the packer panel means for providing a movement of the packer panel means relative to the hopper means and the fixed panel means to obtain a substantially vertical packing of the refuse in the hopper means against the fixed panel means and to provide a forward movement of the refuse through the opening.]

[13. In a refuse collector as set forth in claim 12, the packer panel means being disposed relative to the fixed panel means to provide a wiping of the packer panel means by the fixed panel means to remove refuse from the packer panel means during the vertical packing of the refuse, and the fixed panel means being shaped relative to the packer panel means to facilitate a forward movement of the refuse through the opening during the vertical packing of the refuse.]

[14. In a refuse collector as set forth in claim 13, the packer panel means being provided with a surface engaging the refuse in the hopper means and being provided with a concave curvature throughout the length of such surface to provide a rolling action of the refuse on such surface and to facilitate a breaking of the refuse into small pieces.]

[15. In a refuse collector as set forth in claim 14, the packer panel means including an upper packer panel movable along the fixed panel means in wiping relationship to the fixed panel means during the upward movement of the packer panel means and including a lower packer panel movable in abutting relationship to the forward wall of the hopper means during the upward movement of the packer panel means and the moving means for the packer panel means providing a simultaneous movement of the upper packer panel in wiping relationship to the fixed panel means and the lower packer panel along the forward wall of the hopper means in abutting relationship to such wall.]

16. In a refuse collector, hopper means having a pair of spaced side walls and forward and rear portions spaced from each other, the hopper means being formed from a metal having a high strength, a pair of pivot pins each disposed in the hopper means adjacent an individual one of the side walls and having only a limited length and disposed for movement along the side walls of the hopper means, packer panel means mounted on the pivot pins for pivotal movement and for movement with the pivot pins along the side walls of the hopper means and for lateral movement relative to the side walls of the hopper means, and control means operatively coupled to the packer panel means for producing controlled movements of the packer panel means along the side walls of the hopper means to pack refuse in the hopper means, the pair of pivot pins and the packer panel means being disposed, *without the inclusion of any torsion members*, relative to the side walls of the hopper means to provide for a lateral movement of the packer panel means [relative to] *against* the side walls of the hopper means to prevent the packer panel means from being jammed by unbalanced loads of refuse in the hopper means during the controlled movements of the packer panel means along the side walls of the hopper means, *the pivot pins being constructed to provide for the lateral movement of the packer panel means against the side walls of the hopper means with unbalanced loads of refuse on the packer panel means.*

17. In a refuse collector as set forth in claim 16, means operatively coupled to the control means for obtaining variations in the controlled movement of the packer panel means along the side walls of the hopper means to clear any refuse constituting an obstacle in the storage means to the controlled movements of the packer panel means along the side walls of the hopper means.

18. In a refuse collector as set forth in claim 17, bearings between the pivot pins and the packer panel means, the bearings having particular configurations in their unstressed relationships and being provided with characteristics to provide for the lateral movements of the packer panel means [relative to] *against* the side walls of the hopper means.

[19. In a refuse collector, hopper means for storing the refuse, the hopper means having front and rear walls, fixed panel means disposed relative to the hopper means for defining an opening through which the refuse is moved, packer panel means movable on a cyclical basis from an initial position relative to the hopper means and the fixed panel means through a controlled path to pack the refuse in the hopper means and then back to the initial position, a handle movable between first and second positions, and control means operatively coupled to the packer panel means and responsive to the movement of the handle to the second position to obtain a movement of the packer panel means on the cyclical basis to pack the refuse in the hopper means and to obtain a return of the handle to the first position after the cyclical movement of the packer panel means.]

20. [In a refuse collector as set forth in claim 19,] *In a refuse collector,*

*hopper means for storing the refuse, the hopper means having front and rear walls,*

*fixed panel means disposed relative to the hopper means for defining an opening through which the refuse is moved,*

*packer panel means movable on a cyclical basis from an initial position relative to the hopper means and the fixed panel means through a controlled path to pack the refuse in the hopper means and then back to the initial position,*

*a handle movable between first and second positions, and*

*control means operatively coupled to the packer panel means and responsive to the movement of the handle to the second position to obtain a movement of the packer panel means on the cyclical basis to pack the refuse in the hopper means and to obtain a return of the handle to the first position after the cyclical movement of the packer panel means,* the packer panel means being disposed relative to the hopper means *on low friction bearings* for lateral movement relative to the hopper means to prevent the packer panel means from being jammed by unbalanced loads of refuse in the hopper means during the cyclical movement of the packer panel means.

21. [In the refuse collector as set forth in claim 19,] *In a refuse collector,*

*hopper means for storing the refuse, the hopper means having front and rear walls,*

*fixed panel means disposed relative to the hopper means for defining an opening through which the refuse is moved,*

*packer panel means movable on a cyclical basis from an initial position relative to the hopper means and the fixed panel means through a controlled path to pack the refuse in the hopper means and then back to the initial position,*

*a handle movable between first and second positions, and*

*control means operatively coupled to the packet panel means and responsive to the movement of the handle to the second position to obtain a movement of the packer panel means on the cyclical basis to pack the refuse in the hopper means and to obtain a return of the handle to the first position after the cyclical movement of the packer panel means,* the packer panel means being movable on a cyclic basis relative to the hopper means and the fixed panel means to obtain initially a packing of the refuse *by at least a scooping movement* in a horizontal direction and subsequently a packing of the refuse in a vertical direction, the control means being responsive to the movement of the handle to the first position to provide for the movement of the packer panel means for obtaining an initial packing of the refuse in the horizontal direction and subsequently a packing of the refuse in the vertical direction.

[22. In a refuse collector, hopper means for storing the refuse, the hopper means having forward and rear and bottom walls, fixed panel means disposed relative to the hopper means for defining an opening through which the refuse is moved, packer panel means movable on a cyclical basis from an initial position relative to the hopper means and the fixed panel means to pack the refuse in the hopper means, the cyclical movement of the packer means including a downward movement of the packer panel means close to the rear wall of the hopper means to facilitate the disposition of the refuse in the hopper means, a forward movement of the packer panel means along the bottom wall of the hopper means from the rear wall toward the forward wall of the hopper means to obtain a horizontal packing of the refuse in the hopper means and an upward movement of the packer panel means close to the forward wall of the hopper means to obtain a vertical packing of the refuse in the hopper means, a handle movable between first, second and third positions, and control means responsive to the movement of the handle to the second position to obtain the downward movement of the packer panel means and responsive to the movement of the handle to the third position to obtain the forward and upward movements of the packer panel means.]

[23. In a refuse collector as set forth in claim 22, the control means being responsive to the downward movement of the packer panel means to move the handle to the third position and being responsive to the forward and upward movements of the packer panel means to return the handle to the first position.]

[24. In a refuse collector as set forth in claim 23, the packer panel means being disposed relative to the hopper means for lateral movement relative to the hopper means to prevent the packer panel means from being jammed by unbalanced loads of refuse in the hopper means.]

[25. In a refuse collector as set forth in claim 22, the handle being movable from the third position to the second position and from the second position to the first position and the control means being responsive to such movements of the handle to reverse the movements of the packer panel means for producing downward and rearward movements of the packer panel means upon the movement of the handle from the third position to the second position and for producing upward movements of the packer panel means close to the rear wall of the hopper means upon the movement of the handle from the second position to the first position.]

[26. In a refuse collector, hopper means for storing the refuse, the hopper means having a rear wall, a forward wall spaced from the rear wall and a bottom wall extending between the rear wall and the forward wall, fixed panel means disposed relative to the hopper means to define an opening through which the refuse is moved, packer panel means disposed and movable relative to the hopper means and the fixed panel means from an initial position for providing a packing of the refuse in horizontal and vertical directions and a movement of the refuse through the opening defined by the packer panel means and the hopper means,]

a handle movable between first and second positions, and control means operatively coupled to the packer panel means and responsive to the movement of the handle to the second position to obtain a movement of the packer panel means from the initial position relative to the hopper means and the fixed panel means to produce a packing of the refuse in the horizontal and vertical directions and a movement of the refuse through the opening defined by the packer panel means and the hopper means, the control means being responsive to the movement of the handle to the first position to return the packer panel means to the initial position.]

[27. In a refuse collector as set forth in claim 26, the handle being movable from the second position to the first position prior to the complete movement of the packer panel means in providing the horizontal and vertical packing, the control means being responsive to the movement of the handle from the second position to the first position to move the packer panel means in a direction for clearing an obstacle in the hopper means for the initiation of a new cycle of movement of the packer panel means.]

[28. In a refuse collector as set forth in claim 27, the packer panel means being disposed relative to the hopper means for lateral movement relative to the hopper means to prevent the packer panel means from being jammed by unbalanced loads of refuse in the hopper means.]

[29. In combination in refuse equipment having a tailgate assembly and a storage body, an upper packer panel included within the tailgate assembly;

a lower packer panel included within the tailgate assembly;

first mechanical means operatively coupled to the upper packer panel for providing a movement of the upper packer panel downwardly and rearwardly or upwardly and forwardly, second mechanical means operatively coupled to the upper and lower packer panels for providing a movement of the lower packer panel with the upper packer panel and for providing a rotary movement of the lower packer panel rearwardly or forwardly relative to the upper packer panel, hydraulic circuitry means operatively coupled to the upper and lower packer panels for providing in sequence the rotary movement of the lower packer panel rearwardly, the movement of the upper and lower packer panels downwardly and rearwardly, the rotary movement of the lower packer panel forwardly and the movement of the upper and lower packer panels upwardly and forwardly, a handle manually movable between first and second positions and movable to the first position from the second position to initiate the operation of the hydraulic circuitry means for providing in sequence the movements of the upper and lower packer panels, and third mechanical means operatively coupled to the hydraulic circuitry means and the first and second mechanical means for providing in sequence for the rotary movement of the lower packer panel rearwardly, the movement of the upper and lower packer panels downwardly and rearwardly, the rotary movement of the lower packer panel forwardly and the movement of the upper and lower packer panels upwardly and forwardly and for providing for the return of the handle to the first position upon the movement of the upper and lower packer panels upwardly and forwardly.]

[30. The combination set forth in claim 29, including, a hopper, fourth mechanical means operatively coupled to the upper packing panel for providing for the downward and rearward or upward and forward movements of the upper and lower packing panels in the hopper while providing for lateral movements of the upper and lower packing panels in the hopper, and fifth mechanical means included in the third mechanical means and responsive to particular positions of the third mechanical means for providing in sequence for the rotary movement of the lower packing panel, the downward and forward rotary movement of the lower packing panel and the upward and forward movement of the upper and lower packing panels.]

[31. The combination set forth in claim 30, including, means responsive to an obstruction in the hopper during the forward rotary movement of the lower packing panel for producing an upward and forward movement of the upper and lower packing panels until a clearance of the obstruction and for thereafter providing a completion of the forward rotary movement of the lower packing panel.]

32. In combination in refuse equipment having a tailgate assembly and a storage body, an upper packer panel [including] *included* within the tailgate assembly, a lower packer panel included with the tailgate assembly, linkage means operatively coupled to the upper packer panel and the tailgate assembly for providing for a movement of the upper packer panel in a convex path rearwardly and downwardly or forwardly *and* upwardly,

*there being no torsion members associated with the upper and lower packing panels,* first mechanical means associated with the upper packer panel and movable with the upper packer panel for providing for lateral movements of the upper packer panel *and the lower packer panel with unbalanced loads of refuse on the lower packing panel* during the movement of the *upper* packer panel in the *forward and upward* convex path, second mechanical means operatively coupled to the upper and lower packer panels for providing for a movement of the lower packer panel in the convex path with the upper packer panel and for providing for rotary movements of the lower packer panel forwardly or rearwardly, hydraulic circuitry means operatively associated with the linkage means and the first and second mechanical means for providing in sequence a rotary movement of the lower packer panel rearwardly, a movement in a convex path of the upper and lower packer panels downwardly and rearwardly, a rotary movement of the lower packer panel forwardly and a movement in a convex path of the upper and lower packer panels forwardly and upwardly, a handle normally movable between first and second positions and disposed in the first position and manually operable to the second position, and third mechanical means responsive to the manual operation of the handle to the second position for initiating the operation of the hydraulic circuitry means to obtain the movements in sequence of the upper and lower packer panels.

33. The combination set forth in claim 32 wherein third mechanical means includes means responsive to the movement of the first mechanical means to particular positions for modifying the operation of the hydraulic circuitry means to initiate successive ones of the movements of the upper and lower packer panels in the sequence wherein the third mechanical means further includes fifth mechanical means responsive to the movements of the upper and lower packer panels in the sequence for returning the hydraulic circuitry means to a condition for discontinuing the movements of the upper and lower packer panels.

[34. In combination in refuse equipment having a tailgate assembly and a storage body, a hopper, packing panel means disposed in the hopper and movable initially rearwardly, then downwardly and rearwardly, then forwardly and then upwardly and forwardly in a packing cycle to pack the refuse in the hopper and to introduce the packed refuse into the storage body from the hopper, a handle normally movable between first and second positions and normally disposed in the first position and manually movable to the second position, linkage means operatively coupled to the packing panel means for supporting the packing panel means in the hopper and for providing for the rearward, downward and rearward, forward and then upward and forward movements of the packing panel means in the hopper in the packing cycle while providing for lateral movements of the packing panel means in the hopper to clear obstructions in the hopper, hydraulic circuit means operatively coupled to the packing panel means and responsive to the movement of the handle from the first position to the second position for providing for the movement in the packing cycle of the packing panel means rearwardly, downwardly and rearwardly, forwardly and then upwardly and forwardly, and mechanical means operatively coupled to the hydraulic circuitry means and the handle and responsive to the movement of the packing panel means to particular positions in the packing cycle for providing for the operation of the hydraulic circuitry means in producing subsequent movements of the packing panel means in the packing cycle and in producing a return of the handle to the first position upon the completion of the movements of the packing panel means in the packing cycle.]

[35. The combination set forth in claim 34 wherein the linkage means provides for a movement of the packing panel means in a substantially vertical direction at the end of the downward and rearward path and a movement of the packing panel means in a substantially vertical direction at the beginning of the upward and forward path.]

[36. The combination set forth in claim 35 wherein the linkage means include stub shafts and wherein the stub shafts are operatively coupled to the packing panel means in the hopper to clear obstructions in the hopper and the linkage means are constructed and are operatively coupled to the packing panel means to provide a movement of the packing panel means in a downward and rearward path having a convex curvature and to provide a movement of the packing panel means in an upward and forward path having a convex curvature.]

37. In combination in refuse packing apparatus, hopper means *including a pair of spaced side walls* for storing the refuse, upper packer panel means, lower packer panel means operatively coupled to the upper packer panel means for rotary motion relative to the upper packer panel means and the hopper means, a first pair of linkages operatively coupled to the hopper means and the upper packer panel means for providing for a controlled movement of the upper packer panel means relative to the hopper means, a second pair of linkages operatively coupled to the hopper means and the lower packer panel means for providing for the controlled movement of the upper packer panel means and the lower packer panel means relative to the hopper,

*means including the first and second pairs of linkages for providing for a movement of the packer panel means against the side walls of the hopper means with unbalanced loads of refuse on the packer panel means,*

*the first and second pairs of linkages being operatively coupled to the packer panel means without the inclusion of any torsion members,* means for producing the controlled movement of the upper and lower packer panel means relative to the hopper means, and means for producing the rotary motion of the lower packer panel means relative to the upper packer panel means and the hopper means.

38. The combination set forth in claim 37, the first pair of linkages being coupled to the hopper means at first positions in the hopper means and the second pair of linkages being coupled to the hopper means at second position in the hopper means below the first positions.

39. The combination set forth in claim 38, the second pair of linkages being longer than the first pair of linkages to provide for a movement of the upper and lower packer panel means in a convex path relative to the hopper means.

40. The combination set forth in claim 39 wherein a pair of stub shafts are included and are operatively coupled to the upper packer panel means and the first pair of linkages for providing for lateral displacements of the upper packer panel means and the lower packer panel means *against the side walls of the hopper means with unbalanced loads of refuse on the lower packer panel means* during the movement of the upper packer panel means and the lower packer panel means relative to the hopper means *the stub shafts being constructed to provide for the lateral displacements of the packer panel means against the side walls of the hopper means with unbalanced loads of refuse on the lower packing panel means.*

41. The combination set forth in claim 40 wherein a fixed panel is disposed relative to the upper and lower packer panel means to wipe the upper packer panel means during the movement of the upper packer panel means in the hopper means and to receive and project forwardly the refuse driven by the lower packer panel means.

[42. In combination in refuse packing apparatus, hopper means for storing the refuse, packer panel means, a first pair of linkages attached to the packer panel means and hopper means at upper positions in the packer panel means and the hopper means, a second pair of linkages attached to the packer panel means and the hopper means for positions below the positions of attachment of the first pair of linkages to the packer panel means and the hopper means to cooperate with the first pair of linkages in producing a controlled movement of the packer panel means relative to the hopper means, and means operatively coupled to the packer panel means for producing the controlled movement of the packer panel means relative to the hopper means, the first and second pairs of linkages being disposed relative to the hopper means and the packer panel means to provide for a movement of the packer panel means to provide for a movement of the packer panel means relative to the hopper means in a downward and rearward path having a convex configuration or in an upward and forward path having a convex configuration, the second pair of linkages being longer than the first pair of linkages and the linkages in the first pair being disposed at opposite lateral extremities of the hopper means and the linkages in the second pair being disposed at opposite lateral extremities of the hopper means.]

[43. The combination set forth in claim 42 wherein fixed panel means are disposed in the hopper means to wipe the packer panel means free of refuse during the movement of the packer panel means in the convex path in the hopper means.]

[44. The combination set forth in claim 42 wherein a pair of stub shafts are operatively coupled to the packer panel means and the first pair of linkages at the opposite lateral extremities of the hopper means to provide for lateral shifts in the positioning of the packer panel means in the hopper means during the movement of the packer panel means in the convex path in the hopper means.]

*45. In a combination as set forth in claim 37,*

*a first pair of pivot pins having only limited lengths and supported by the hopper means and supporting the first pair of linkages,*

*a second pair of pivot pins having only limited lengths and supported by the hopper means and supporting the second pair of linkages,*

*a first pair of stub shafts having only limited lengths, the linkages in the first pair and the upper panel being mounted on the stub shafts in the first pair,*

*a second pair of stub shafts having only limited lengths, the linkages in the second pair, the upper panel and the lower panel being mounted on the stub shafts in the second pair,*

*the means for producing the movement of the upper and lower packing panels including packing cylinders pivotally disposed relative to the hopper at one end and mounted at the other end on the stub shafts in the second pair of pivotal movement on a fulcrum defined by the stub shafts in the second pair,*

*the means for producing the rotary movement of the lower panel relative to the upper panel including sweep cylinders pivotally supported relative to the hopper means at one end and coupled at the other end to the lower panel at positions displaced from the stub shafts in the second pair for producing a rotation of the lower panel relative to the upper panel on a fulcrum defined by the stub shafts in the second pair,*

*the pivot pins in the first and second pairs and the stub shafts in the first and second pairs being constructed to provide for lateral displacements of the packer panels means against the side walls of the hopper means with unbalanced loads of refuse on the hopper means.*

*46. In a combination as set forth in claim 45,*

*a third pair of pivot pins having only limited lengths and supporting the packing cylinders at the one end of the packing cylinders,*

*a fourth pair of pivot pins having only limited lengths and supporting the sweep cylinders at the one end of the sweep cylinders,*

*the stub shafts in the first and second pairs being respectively disposed at the top and bottom of the upper panel,*

*the pivot pins in the third and fourth pairs being constructed to provide for a lateral displacement of the packer panel means against the side wall of the hopper means with unbalanced loads of refuse on the packer panel means.*

*47. In a combination as set forth in claim 46,*

*the first pair of linkages having a different length than the second pair of linkages,*

*the first pair of linkages having a non-parallel relationship to the second pair of linkages,*

*the distances between the linkages in the first pair and the linkages in the second pair at the position of the upper packing panel corresponding substantially to the height of the upper packing panel in the upward and forward position of the packer panel within the hopper means,*

*the coupling of the upper and lower linkages relative to the upper and lower panels providing for an independent positioning of the upper and lower panels at one side of the hopper relative to the positioning of the upper and lower panels at the other side of the hopper means with unbalanced loads on the panels,*

*the upper and lower panels having sides,*

*the sides of the upper and lower panels being disposed adjacent the side walls of the hopper means,*

*the sides of the upper and lower panels being substantially planar.*

*48. In a refuse collector as set forth in claim 16,*

*the packer means including upper and lower panels mounted on the pivot pins,*

*the pivot pins having only limited lengths,*

*the control means including packing cylinders having first and second opposite ends and pivotally supported relative to the hopper means at the first ends and mounted at the second ends on the pivot pins for moving the upper and lower panels between an upward and forward position and a downward and rearward position,*

*the control means further including sweep cylinders having first and second opposite ends and pivotally supported relative to the hopper means at the first ends and mounted at the second ends on the lower panel for rotating the lower panel relative to the upper panel between forward and rearward positions on a fulcrum defined by the pivot pins,*

*the control means further including a plurality of links operatively coupled to the upper panel and to the hopper means for producing a controlled movement of the upper and lower panels in a curved path between the upward and forward positions and the rearward and downward positions,*

*particular ones of the links in the plurality being mounted on the pivot pins.*

*49. In a refuse collector as set forth in claim 48,*

*a pair of stub shafts having only a limited length,*

*the top of the upper panel and the other links in the plurality being mounted on the stub shafts,*

*the bottom of the upper panel being mounted on the pivot pins,*

*the particular links in the plurality having a different length than the other links in the plurality and having a non-parallel relationship to the other links in the plurality,*

*the pivot pins in the pair being disposed at the opposite sides of the hopper means,*

*the stub shafts in the pair being disposed at the opposite sides of the hopper means,*

*the particular links in the plurality being disposed at the opposite sides of the hopper means,*

*the other links in the plurality being disposed at the opposite sides of the hopper means,*

*the stub shafts in the pair being constructed to provide for a lateral movement of the upper and lower panels against the side walls of the hopper means with unbalanced loads of refuse on the lower panel.*

*50. In a refuse collector as set forth in claim 49,*

*second and third pairs of pivot pins supported by the hopper means, each of the pivot pins in the second and third pairs having only a limited length,*

*the particular links in the plurality being mounted on the second pair of pivot pins,*

*the other links in the plurality being mounted on the third pair of pivot pins,*

*a fourth pair of pivot pins supported by the hopper means, the pivot pins in the fourth pair having only a limited length,*

*the first ends of the sweep cylinders being mounted on the fourth pair of pivot pins,*

*a fifth pair of pivot pins, the pivot pins in the fifth pair having only a limited length,*

*the first ends of the packing cylinders being mounted on the fifth pair of pivot pins,*

*the pivot pins in the second, third, fourth and fifth pairs being constructed to provide for a lateral displacement of the upper and lower panels against the side walls of the hopper means with unbalanced loads of refuse on the lower panel.*

*51. In a refuse collector as set forth in claim 48,*

*the upper and lower packing panels having sides disposed in adjacent relationship to the side walls of the hopper means,*

*the sides of the upper and lower packing panels and the side walls of the hopper means being provided with planar configurations to provide for a rubbing of the upper and lower panels against the side walls of the hopper means when the upper and lower panels are displaced laterally relative to the side walls of the hopper means by any unbalanced loads on the upper and lower panels in the hopper means.*

*52. In a refuse collector as set forth in claim 49,*

*the links in the plurality being coupled to the hopper means and to the upper panel for providing for a positioning of the links in the plurality on one side of the hopper means independently of the positioning of the links in the plurality on the other side of the hopper means with unbalances in the load on the upper and lower panels.*

*53. In a refuse collector as set forth in claim 52,*

*the upper and lower packing panels having sides disposed in adjacent relationship to the side walls of the hopper means,*

*the sides of the upper and lower packing panels and the side walls of the hopper means being provided with substantially planar configurations to provide for a rubbing of the upper and lower panels against the side walls of the hopper means when the upper and lower panels are displaced laterally relative to the hopper means,*

*the links in the plurality being coupled to the hopper means and to the upper panel for providing for a positioning of the links in the plurality on one side of the hopper means independently of the positioning of the links in the plurality on the other side of the hopper means with unbalances in the load on the upper and lower panels.*

* * * * *